US012573838B2

(12) United States Patent
Holveck

(10) Patent No.: US 12,573,838 B2
(45) Date of Patent: Mar. 10, 2026

(54) AUTONOMOUS DETECTION OF RAPID SHUTDOWN CONDITION

(71) Applicant: Lunar Energy, Inc., Mountain View, CA (US)

(72) Inventor: Mark Holveck, Sunnyvale, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 18/658,833

(22) Filed: May 8, 2024

(65) Prior Publication Data

US 2024/0364101 A1 Oct. 31, 2024

Related U.S. Application Data

(63) Continuation of application No. 18/114,500, filed on Feb. 27, 2023, now Pat. No. 12,015,265.

(60) Provisional application No. 63/416,299, filed on Oct. 14, 2022, provisional application No. 63/314,975, filed on Feb. 28, 2022.

(51) Int. Cl.
*H02H 7/20* (2006.01)
*H02M 1/36* (2007.01)

(52) U.S. Cl.
CPC ................ *H02H 7/20* (2013.01); *H02M 1/36* (2013.01)

(58) Field of Classification Search
CPC .......... H02H 7/10; H02H 7/12; H02H 7/1203; H02H 7/1213; H02H 7/1222; H02H 7/1227; H02H 7/1285; H02H 7/26; H02H 7/268; H02H 3/12; H02H 3/20; H02S 40/30; H02S 40/32; H02S 40/34; H02J 3/001; H02J 3/383; H02J 3/88; H02J 3/38
See application file for complete search history.

(56) References Cited

U.S. PATENT DOCUMENTS

| | | |
|---|---|---|
| 7,605,498 B2 | 10/2009 | Ledenev |
| 7,719,140 B2 | 5/2010 | Ledenev |
| 7,884,278 B2 | 2/2011 | Powell |
| 8,823,218 B2 | 9/2014 | Hadar |
| 8,922,061 B2 | 12/2014 | Arditi |
| 8,933,321 B2 | 1/2015 | Hadar |
| 9,106,105 B2 | 8/2015 | Mccaslin |
| 9,584,021 B2 | 2/2017 | Avrutsky |
| 9,673,630 B2 | 6/2017 | Ledenev |
| 9,812,869 B2 | 11/2017 | Narla |
| 9,923,379 B2 | 3/2018 | Narla |
| 9,941,421 B2 | 4/2018 | Dunton |
| 9,966,848 B2 | 5/2018 | Avrutsky |

(Continued)

FOREIGN PATENT DOCUMENTS

WO          2023163786          8/2023

*Primary Examiner* — Gustavo A Rosario-Benitez
(74) *Attorney, Agent, or Firm* — Van Pelt, Yi & James LLP

(57) ABSTRACT

A rapid shutdown system includes a PV (photovoltaic) generator. It further includes a DC (Direct Current)-DC converter receiving power from the PV generator and outputting power. The DC-DC converter outputs power at a high voltage state or a low voltage state. It further includes a DC bus coupled to the DC-DC converter to receive the power outputted by the DC-DC converter. The DC bus is coupled to a system comprising a load. The DC-DC converter transitions from the high voltage state to the low voltage state based at least in part on an output current of the DC-DC converter transitioning below a threshold.

20 Claims, 8 Drawing Sheets

(56) References Cited

U.S. PATENT DOCUMENTS

| | | | |
|---|---|---|---|
| 10,256,770 B2 | 4/2019 | Hadar | |
| 10,333,405 B2 | 6/2019 | Avrutsky | |
| 10,608,437 B2 | 3/2020 | Ledenev | |
| 10,886,746 B1 | 1/2021 | Ledenev | |
| 11,070,062 B2 | 7/2021 | Ledenev | |
| 11,070,063 B2 | 7/2021 | Ledenev | |
| 11,289,917 B1 | 3/2022 | Ledenev | |
| 11,356,055 B2 * | 6/2022 | Pozsgay | H02S 50/00 |
| 11,670,945 B1 | 6/2023 | Holveck | |
| 2012/0080943 A1 * | 4/2012 | Phadke | H02J 3/381 |
| | | | 307/24 |
| 2013/0320778 A1 | 12/2013 | Hopf | |
| 2016/0329715 A1 | 11/2016 | Orr | |
| 2017/0207620 A1 * | 7/2017 | Zhu | H02J 3/381 |
| 2018/0309300 A1 | 10/2018 | Dai | |
| 2019/0074684 A1 | 3/2019 | Craciun | |
| 2019/0181800 A1 | 6/2019 | Nesemann | |
| 2019/0326757 A1 * | 10/2019 | Yao | H02J 3/46 |
| 2019/0326758 A1 * | 10/2019 | Zhu | H02M 3/33573 |
| 2019/0341806 A1 | 11/2019 | Judkins | |
| 2020/0136393 A1 | 4/2020 | Satake | |
| 2020/0343729 A1 * | 10/2020 | Zhu | H02J 3/38 |
| 2021/0351592 A1 | 11/2021 | Gu | |
| 2021/0391710 A1 * | 12/2021 | Yang | H02J 3/381 |
| 2021/0391783 A1 | 12/2021 | Zimmanck | |
| 2022/0038052 A1 * | 2/2022 | Yu | H02S 40/32 |
| 2023/0126969 A1 | 4/2023 | Yang | |
| 2024/0072534 A1 * | 2/2024 | Yang | H02J 3/381 |

* cited by examiner

400

Start

Determine that a voltage measured relative to an output of a PV converter is at a threshold voltage limit, and that an output current of the PV converter is at or below a threshold current — 402

Transition from operating in a high voltage state to a low voltage state — 404

End

600

Start

Detect that a voltage on a DC bus is at or above a threshold voltage ⌐602

Increase the voltage on the DC bus using an energy storage device ⌐604

End

AUTONOMOUS DETECTION OF RAPID SHUTDOWN CONDITION

CROSS REFERENCE TO OTHER APPLICATIONS

This application is a continuation of U.S. patent application Ser. No. 18/114,500, entitled AUTONOMOUS DETECTION OF RAPID SHUTDOWN CONDITION filed Feb. 27, 2023 which is incorporated herein by reference for all purposes, which claims priority to U.S. Provisional Application No. 63/314,975, entitled RAPID SHUTDOWN filed Feb. 28, 2022 which is incorporated herein by reference for all purposes, and claims priority to U.S. Provisional Application No. 63/416,299 entitled RAPID SHUTDOWN filed Oct. 14, 2022 which is incorporated herein by reference for all purposes.

BACKGROUND OF THE INVENTION

Being able to quickly de-energize a solar power system is important for the safety of first responders. As such, it is beneficial to have intelligent and resilient techniques for rapid shutdown.

BRIEF DESCRIPTION OF THE DRA WINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of implementing rapid shutdown of a photovoltaic (PV) array. Using embodiments of the techniques described herein, rapid shutdown is facilitated by PV converters that are configured to autonomously detect when to enter rapid shutdown, without requiring communications with other components in a power system.

Rapid shutdown is a requirement for solar systems, such as those installed on the rooftops of homes and buildings. For example, there is a requirement that a mechanism is provided to shut the solar system down that is accessible from the exterior of a building (such as a home). Once that mechanism is triggered, within 30 seconds, there should be no voltages on the roof (or any other surface on which panels are mounted or otherwise installed) greater than 30V.

Figure 1:
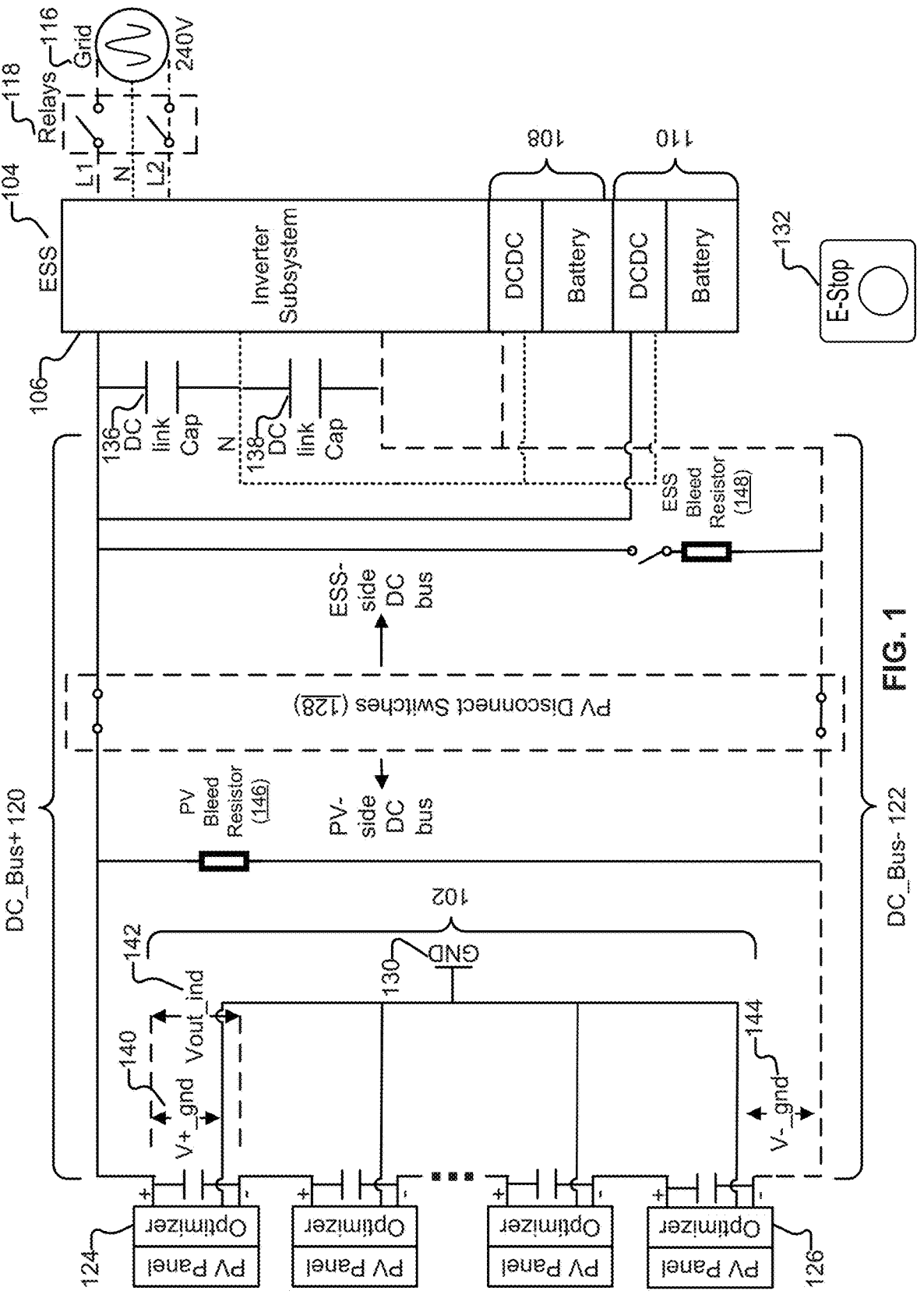
FIG. 1 illustrates an embodiment of an electrical power system.

FIG. 1 illustrates an embodiment of an electrical power system. In the example of FIG. 1, the electrical power system includes an array of photovoltaic (PV) panels 102, and an energy storage system (ESS) 104. As shown in this example, each of the PV panels is connected to a corresponding optimizer (also referred to herein as a "maximizer" or "PV converter" or "module-level power electronics (MLPE)"). The power optimizers are arranged in series in a string. As one example, a string of optimizers includes 10 optimizers. In various embodiments, an optimizer string includes any number of optimizers as appropriate. In some embodiments, a site may have multiple strings of PV panels/ optimizers in parallel (e.g., if there are multiple arrays installed). As shown in this example, each PV converter also includes a connection to a common node 130 that is common to each of the PV converters in the string. In some embodiments, the common node is a reference or ground that is common to all of the PV converters in the string. While in this example, the common node is connected to the ground reference (e.g., for code purposes), the common node need not be a ground reference.

In this example, the ESS 104 includes inverter 106. The ESS also includes battery modules 108 and 110. Each battery module includes a battery storage (or any other type of energy storage as appropriate, such as a fuel cell) and a DC-DC converter. The inverter connects to the electrical wiring of a site (e.g., home site's main breaker panel). The inverter is also connected to grid 116 (e.g., utility grid). In the example shown, a set of relays (118) is between the inverter and the grid, allowing control of whether the inverter is connected to the grid (where the inverter is then referred to as operating in a "grid-tied" or "grid-connected" mode), or disconnected from the grid (where the inverter is then referred to as being in a "standalone" mode). The inverter is an example of a converter that is configured to convert/invert DC power from the PV array and/or batteries to AC power (e.g., to deliver power to the home and/or grid, and vice versa (e.g., converting AC power from the grid to DC power to, for example, charge the batteries)).

In the example of FIG. 1, the inverter is of a split bus architecture, where the inverter DC (Direct Current) bus at the input of the inverter is split into two halves, a positive half between the positive side of the DC bus 120 (DC_Bus+) and neutral (N), and a negative half of the DC bus between the negative side of the DC bus 122 (DC_Bus−) and neutral (N).

As shown in the example of FIG. 1, there is a set of PV disconnect switches 128 that, when closed, connect the PV array to the ESS-side of the power system (that includes the battery and the inverter). As shown in this example, the positive side of the DC bus (120) is electrically connected to an output terminal of the "top" optimizer 124, and the negative side of the DC bus (122) is connected to an output terminal of the "bottom" optimizer 126.

In the example of FIG. 1, an energy system architecture is shown that includes a PV array with multiple solar panels, where each solar panel includes a DC/DC converter coupling the panel to a panel-side DC power bus. The energy system architecture further includes a set of battery storage devices, each coupled to a battery-side DC power bus. The energy system architecture further includes an inverter module connected to the panel-side DC power bus (when switches 128 are closed) and the battery-side DC power bus, joining the two buses and receiving power from the combination of buses to drive the inverter for powering a site such as a home.

Shown in the example of FIG. 1 are two example mechanisms for initiating rapid shutdown. In one embodiment, rapid shutdown is initiated by physically opening switches 128. For example, switches 128 are a PV disconnect switch integrated into the inverter. In some embodiments, the PV disconnect switch is activated by turning a knob that is accessible to a user (other mechanisms for opening the PV disconnect switches may be used, as appropriate). For example, the physical knob or switch is located on the side of a box or enclosure that is mechanically connected to the PV disconnect switches.

In some embodiments, when a user turns the knob to initiate rapid shutdown, turning of the knob causes the PV disconnect switches to open, causing the PV-side of the system to be electrically and physically disconnected from the ESS-side of the system. This results in the DC bus being split into two portions, where there is a PV-side DC bus and an ESS-side DC bus. When the PV disconnect switch is closed, the PV-side DC bus and ESS-side DC bus are electrically connected, and effectively form a single DC bus (as shown in the example of FIG. 1) to which the PV array, battery storage, and inverter are connected.

In another embodiment, rapid shutdown is initiated by a user activating an input such as a button. For example, a user initiates rapid shutdown by pressing emergency stop button 132. For example, if the system is indoors, then a shutdown switch is installed external to the home, where wires are run inside and installed in the home controller system (e.g., ESS 104). This allows a shutdown to be initiated remotely from outside.

Further details regarding rapid shutdown will be described below.

Figure 2:
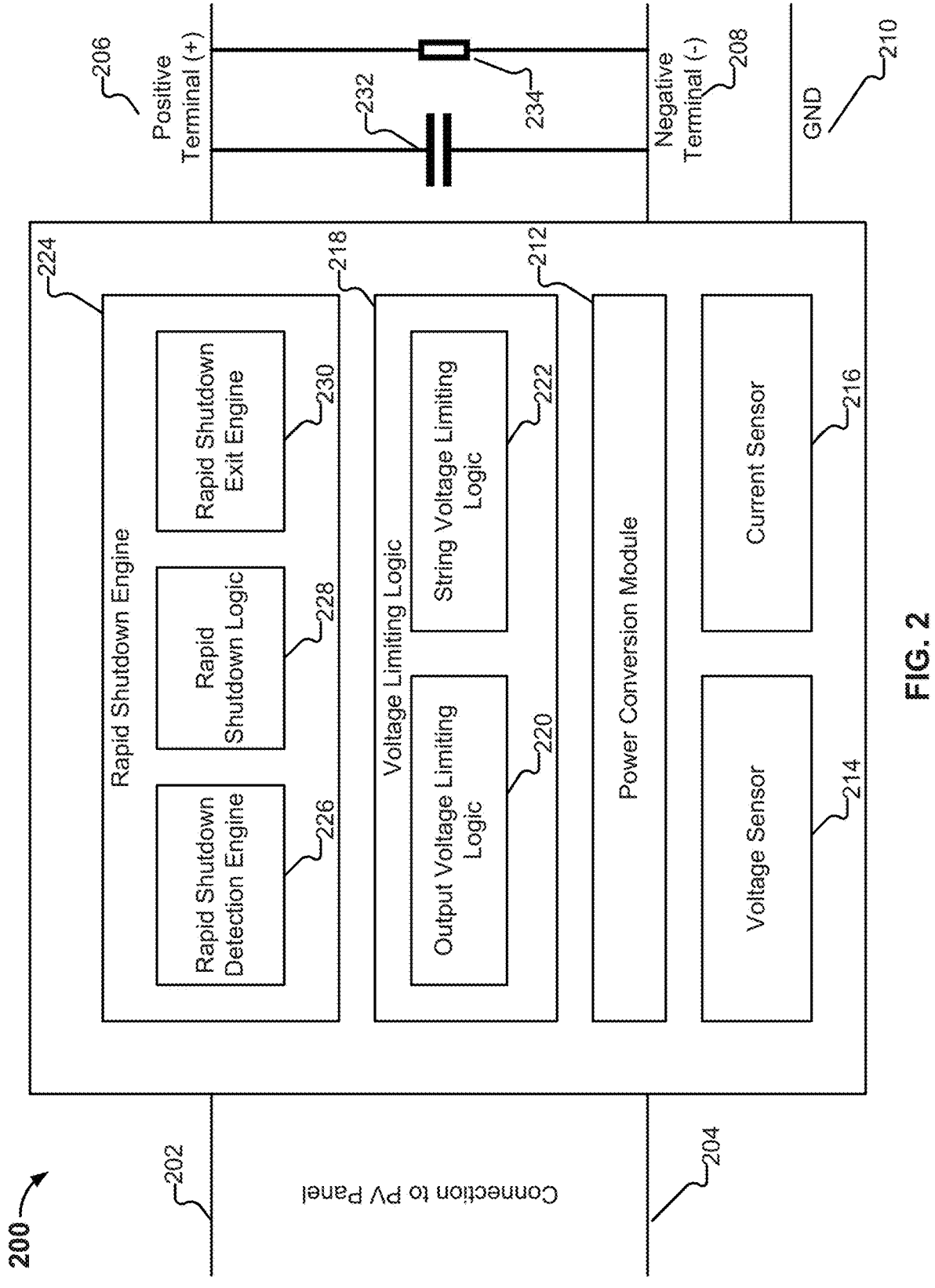
FIG. 2 illustrates an embodiment of a PV (photovoltaic) converter.

FIG. 2 illustrates an embodiment of a PV (photovoltaic) converter. In some embodiments, PV converter 200 is an example of a PV converter such as that shown in the example optimizer string 102 of FIG. 1. As shown in this example, the PV converter includes input terminals 202 and 204, which connect to the output of a corresponding PV panel. The PV converter also includes positive output terminal 206 and negative output terminal 208. In the example of FIG. 1, the positive output terminal of an optimizer in the optimizer string 102 is either connected to the negative terminal of another optimizer (placing them in series), or is connected to the positive-side of the PV-side DC bus. The negative output terminal of an optimizer is either connected to the positive terminal of another optimizer, or is connected to the negative-side of the PV-side DC bus. In this example, the PV converter also includes an output terminal that is connected to the ground or voltage reference 130 that is common to the optimizers in a PV optimizer string. The PV converter also includes power conversion module 212, which is configured to perform DC-DC conversion. The power conversion module also controls output voltage by controlling output current.

In this example, the PV converter includes voltage sensor 214 and current sensor 216. For example, the voltage sensor and the current sensor are used to measure the output voltage and output current of the PV converter. In some embodiments, each PV maximizer has embedded a current sensor. A separate current sensor may also be used to detect the current of the PV maximizer. In some embodiments, the voltage sensor is used to measure its own output voltage, as well as other output voltages relative to its terminals. For example, the voltage sensor measures the voltage across/ between the output terminals 206 and 208. As another example, the voltage sensor is configured to measure the voltage between the positive output terminal 206 and GND 210 (130). For the top optimizer 124, this will be the difference in voltage between the positive side of the PV-side DC bus and the common reference ground 130. The voltage sensor may also be used to measure the voltage between the negative output terminal 208 and ground 130. For the bottom optimizer 126, this will be the difference in voltage between the negative side of the PV-side DC bus and the common reference ground 130.

In some embodiments, the PV converter includes circuitry and components such as capacitor 232 and resistance 234. The resistance may be a set of series resistors or load that are part of the voltage sensing logic of the PV converter. In some embodiments, the output voltage of the optimizer (across its output terminals 206 and 208) is determined based on the amount of charge on the capacitor. For example, the output voltage of the PV converter is determined based on the amount of current poured into the capacitor from the PV converter, and the current that is drawn from the capacitor (e.g., if there is a load on the string of optimizers). For example, if there is more current going into the capacitor from the PV converter than is being drawn out from it (net current into the capacitor), then the net charge on the capacitor increases, and the output voltage of the PV converter will rise. If there is more current being pulled out of the capacitor than feeding into it from the PV panel (net current out of the capacitor), then the net charge on the capacitor decreases, and the output voltage of the PV converter will decrease. In some embodiments, resistance 234 is configured to act as a bleed resistor, where if the PV converter is off (and not pouring current into the capacitor), then the resistor bleeds off the charge of the capacitor, thereby discharging the capacitor, and reducing the output voltage of the PV converter. In another embodiment, the PV maximizer limits or reduces its output voltage by discharging the output capacitor and dissipating power by pushing current back into the connected PV panel.

In this example, the PV converter also includes voltage limiting logic 218, which is configured to implement voltage limiting logic, which will be described in further detail below. In this example, voltage limiting logic 218 further includes output voltage limiting logic 220, which, as will be described in further detail below, is configured to limit the voltage across the outputs of the PV converter (across terminals 206 and 208) from exceeding a maximum voltage. Voltage limiting logic 218 further includes string voltage limiting logic 222, which is configured to control the output voltage and/or current of the PV converter to facilitate an overall string voltage from exceeding a string voltage limit (where the voltage limiting performed by each PV converter individually will result in the overall string voltage to be limited).

As shown in the example of FIG. 2, the PV converter further includes rapid shutdown engine 224. Rapid shutdown engine 224 further includes rapid shutdown detection engine 226, rapid shutdown logic 228, and rapid shutdown exit engine 230. Further details regarding rapid shutdown are described below.

Optimizer Voltage Limiting

As described above, in some embodiments, each PV converter is configured with voltage limiting logic. The voltage limiting logic includes optimizer output voltage limiting logic to prevent each individual optimizer from overvoltage. The voltage limiting logic also includes string voltage limiting logic to limit total string voltage (i.e., the total voltage across the string of optimizers) in order to protect the ESS-side inverter and batteries from overvoltage (and also to comply with any residential voltage limit requirements).

In some embodiments, the optimizers execute the voltage limiting logic autonomously, without requiring knowledge of the state of the other optimizers in a string. As such, communications are not required amongst the optimizers. While the optimizers operate autonomously, and independently of each other, without knowledge of how the other optimizers in a string are operating, collectively, by operating according to the same voltage limiting logic described herein, overvoltage issues, even at a string level, may be prevented.

Further details regarding optimizer output voltage limiting and string voltage limiting are described below. As will also be disclosed in further detail below, embodiments of the voltage limiting logic described herein are utilized to facilitate rapid shutdown.

Optimizer Output Voltage Limiting

In some embodiments, embodiments of the optimizer output voltage limiting feature are configured to limit the individual output of the optimizer (e.g., across its output terminals) to protect each individual optimizer from overvoltage, and also to promote voltage balancing in imbalance cases.

In various embodiments of optimizer output voltage limiting, each optimizer limits its output current to a value that is 100% when the output voltage measures a threshold number of volts below a maximum allowable voltage, V_max (measured across the output terminals 206 and 208), and equal to 0% at V_max. In this way, by limiting the current to 0%, the output voltage of the optimizer will not increase beyond V_max (maximum allowed voltage between the positive and negative output terminals of the optimizer). One example of V_max is 60V in normal operation (the maximum may be any other value, as appropriate). In some embodiments, the individual V_max of the optimizer is determined based on a function of a maximum allowed string voltage and the number of optimizers in a string (that includes multiple optimizers). For example, if the maximum allowed string voltage is 500V, and there are 10 optimizers in a string, then the individual V_max for the optimizer is 50V (500V divided by 10 optimizers).

In some embodiments, at voltages above V_Max, the current is forced negative following the same slope, up to a maximum allowable negative current value I_Neg_Min (e.g., −4 A into the solar panel, sinking current from the output capacitor). This prevents any optimizer from driving its own voltage above a safe value, and the negative current prevents sudden bus voltage changes from causing transient overvoltage conditions in scenarios where optimizers were imbalanced (e.g., with different output voltages) to begin with. For example, if the DC bus voltage were to suddenly increase, this would cause all of the maximizers to charge up by the same amount. For example, if the DC bus voltage were to suddenly increase by 50V, the transient voltage increase would cause each optimizer in the string to see an equal share of the voltage increase (e.g., 50V/N optimizers), causing their output voltages to also be driven up. In some embodiments, the aforementioned negative current allows current to be drawn out of the optimizers' capacitors, preventing overcharging. In some embodiments, the current is a function of the voltage, where the current would become negative when the optimizer output voltage exceeds a maximum voltage threshold (V_max), preventing the output voltage from going higher.

String Voltage Limiting

The following are embodiments of string voltage limiting. Embodiments of the string voltage limiting feature described herein allow optimizers (in a string such as string 102) to limit total string voltage (e.g., the total series voltage of the entire string of optimizers) to a specified value, without requiring communications, in order to protect the inverter/batteries from overvoltage and in order, for example, to comply with residential voltage limits (e.g., 600V).

In some embodiments, the string voltage limiting feature is used to allow string lengths longer than Vmax_string/Voc. (where an example range for the Vmax_string value is between 450V-500V, and where Voc refers to open circuit voltage).

In some embodiments, the string voltage limiting feature is supported by voltage sensing relative to a ground that is common to all of the optimizers in the string (e.g., GND 130), or a home-run included architecture. In one embodiment of a home-run architecture, the positive output of the top optimizer (e.g., positive terminal of optimizer 124) is passed through the optimizers in the string to the bottom optimizer. In some embodiments, the pass through is implemented by including two additional home-run pass through terminals in each maximizer (in addition to the positive and negative output terminals), where the pass-through terminals are connected between maximizers in series such that the positive output of the top optimizer is daisy-chained and passed through all of the optimizers in the string, all the way back down to the bottom optimizer (e.g., optimizer 126).

As described above, there are multiple types of voltage limits that an optimizer may observe. For example, if an optimizer reaches its own individual maximum (e.g., across its positive and negative output terminals), then it will limit its voltage to the individual maximum voltage. However, if before they reach their own individual maximum, it is determined that collectively the output voltages of the overall string exceed the string voltage limit, the optimizers will adjust their own voltage outputs until the overall string voltage is limited to the maximum allowed string voltage.

The following are embodiments of string voltage limiting in which each optimizer is configured with voltage sensing relative to ground. As one example, the string voltage limit (for the voltage measured across the PV-side DC bus) is set to be 550V (or any other voltage as appropriate). In some embodiments, each optimizer limits its own output voltage by reducing output current, such that it limits the voltage measured between its positive output node and ground to 275V (half of the string voltage limit), or limits the voltage measured between its negative output node and ground to −275V (e.g., for bottom optimizer 126). This will result in optimizers at the top and bottom of the string (e.g., optimizers 124 and 126, respectively) reducing their output voltage to zero such that the total voltage across the string is no greater than 275V+275V=550V.

In embodiments in which there is a home-run architecture, sensing to ground is not required. In this case, for example, each optimizer is configured to limit its own output voltage by reducing output current, such that it limits the voltage measured between its positive output node and the home run node to 550V. This will result in optimizers at the top of the string reducing their output voltage to zero such that the total voltage across the string is no greater than 550V (or whatever overall string voltage limit is selected).

The following are further embodiments regarding the voltage limiting logic. As described above, in some embodiments, the PV converter controls the voltage at its output by controlling its output current.

During normal operation, the PV disconnect switches are closed, and the PV optimizers are connected to the ESS-side DC bus with the DC link capacitors 136 and 138. For example, the optimizers in a string are connected in series with each other and are connected to the DC link capacitors when the PV disconnect switches are closed and the PV array and the ESS are connected together via the DC bus. In order for each of the PV converters to hold their individual voltage limits (or prevent them from being exceeded), their individual currents would also have to be zero, because if the PV converters were to output even a small amount of current for a short time, their voltage would go above the voltage limit. This is because an optimizer has a capacitor at its output, and the PV converter's own capacitor voltage would increase. So, in some embodiments, in order to limit the voltage, the PV converter's current is also at zero, to prevent its own voltage from continuing to rise, which would violate the individual optimizer output voltage limit. So, in various embodiments, the PV converter's voltage limiting feature means that the PV converter is only able to put in as much current into their own capacitor as is being drawn out of it by another component. So, if there is zero current drawn out of the capacitor (e.g., because there are no loads to accept or draw current), then the PV converter will also need to have zero current in order to keep or maintain the voltage at the limit.

The PV optimizer's technique for maintaining the voltage limit automatically matches current to input and output. If a component or load draws an amp, the PV optimizer will automatically deliver an amp to maintain the voltage limit. Only if more current is being drawn than can be produced from the solar panel will the PV optimizer come down from the voltage limit (that is, more current is being drawn by the ESS-side than can be provided by the optimizers). The output voltage will then decrease to below the limit value. For example, the batteries will be operating to hold down the DC link capacitor voltage to one level (e.g., 400V), while the PV array will be charging up until it hits its voltage limit of 550V. If the batteries are "winning" and drawing more current than the PV panels can produce, which is typically the case, then the DC bus voltage will stay closer to the 400V limit. However, if the batteries draw little to no current (e.g., due to rapid shutdown or because the batteries are full), then the DC bus will be pulled up by the PV panels to the string voltage limit 550V. If the home is grid tied, even if the batteries are full (and are no longer accepting charge), and there are negligible loads, the inverter can pull power from the bus (and pull down its voltage) by delivering power to the grid.

However, if the grid is disconnected, the batteries are full, and any loads draw much less power than what the PV panels can provide, then there are no loads to draw current from the capacitors of the PV converters, and the voltage on the DC bus will rise up to the string limit setting (as there are no loads to take away the current that the optimizers are providing onto their output capacitors, and so the DC bus voltage will continue to rise until a voltage limit is reached, and the PV converter is configured to reduce its output current in order to prevent the string voltage from further increasing). As described above, the combination of a PV optimizer being at its voltage limit and having zero net load from the string means that each of the PV optimizer's currents will be forced to zero. Within a short amount of time, once this equilibrium state is settled to, the currents of the PV maximizers will all go to zero because the load current is also zero.

That is, when a PV optimizer is up against its voltage limit, and holding the output voltage to a steady value, this means that the PV optimizer is matching input current to output current to ensure that its voltage does not rise and exceed the limit. Rather, there is net zero current, so that there is not charge accumulating, for example, on the output of the capacitors, causing the output voltages of the PV converters to also rise. When this is paired with driving the current to zero, then the internal currents of the PV converter also go to zero because they are in voltage limiting mode.

As will be described in further detail below, the voltage limiting logic described above is adapted to facilitate rapid shutdown, for example, by adjusting the voltage limits depending on whether the PV converter is operating in a normal mode or in a rapid shutdown mode.

Rapid Shutdown

In some embodiments, the rapid shutdown techniques described herein do not rely on the battery blocks to assist in absorbing energy or in pulling down the voltage on the DC bus. While it may be technically possible to use the battery blocks/modules for this purpose, they may not be able to do so at any given time. For example, it may be the case that when a rapid shutdown command is issued, the battery blocks are not available to assist in bringing the DC bus voltage down if they are 100% charged, in which case they would not be able to absorb energy from the DC bus to bring down the DC bus voltage. In some embodiments, the rapid shutdown techniques described herein do not rely on the DC-DC power converters coupled to the battery modules to facilitate rapid shutdown.

Further, the rapid shutdown techniques described herein do not rely on communication between the optimizers and any other components in the system to facilitate rapid shutdown.

As described above, the requirements for rapid shutdown are that the DC voltage (e.g., on the roof, where the PV panels are) needs to be <30V in <30 seconds after a "shutdown command."

A user may initiate rapid shutdown in a variety of ways. Two example ways of initiating rapid shutdown are described above. One example way to initiate rapid shutdown is to physically open an integrated PV disconnect switch that is between the PV converters and the inverter (e.g., by turning a knob to open PV disconnect switches 128). As another example, rapid shutdown is initiated by a user by activating a user input such E-stop button 132

In response to a person (e.g., firefighter or emergency responder) either pressing the E-Stop button 132, or opening switches 128, then the voltage at the roof (across solar panel array outputs) is required to be brought down to be less than 30V in under 30 seconds, per the rapid shutdown requirements described above.

In the architecture described herein, and as shown in the example of FIG. 1, the PV array connects (e.g., via wiring) to an internal DC bus (across DC_Bus+ 120 and DC_Bus− 122). For example, the outputs of the optimizer string are connected, via wiring, to the positive side of the DC bus and the negative side of the bus, as shown in the example of FIG. 1. This electrically connects (if the PV disconnect switches 128 are closed) the PV optimizer string to the ESS-side of the power system, which includes the inverter and the battery modules (where each module is a combination of a battery block and a corresponding DC-DC converter). In this example, suppose that either E-stop button 132 has been pressed or the off-switch 134 has been activated, in order to bring the power system down. In this example, when this occurs, this causes the PV disconnect switches 128 to be opened. This results in the DC bus becoming, effectively, two DC buses that are isolated from one another-a PV-side DC bus (also referred to herein as a PV circuit), and what is referred to herein as an ESS-side DC bus (where when the switches are closed, there is effectively a single DC bus that the PV array, inverter, and battery blocks are electrically connected to). The PV array is connected to the PV-side DC bus, and the inverter/battery blocks are connected to the ESS-side DC bus. In some embodiments, the voltages on both the PV-side DC bus and the ESS-side DC bus must be brought down in line with the requirements of rapid shutdown.

Two example ways of commanding rapid shutdown in the system are described above. In one embodiment, when a knob is turned, it physically disconnects the PV array from the DC bus (e.g., opens switches 128). As described above, this results in effectively two separate DC buses-a PV-side DC bus (to the left of the switches 128), and an internal-side DC bus (to the right of the switches 128) to which the batteries and inverter are connected. In this case, keeping a low voltage on the internal-side DC bus does not necessarily mean that there is voltage across the outputs of the PV array, and vice versa (because the PV array and the ESS-side are disconnected from each other). As will be described in further detail below, the output of the PV array is also configured to keep the voltage to a low, but not non-zero voltage in some embodiments. If the switches 128 are open, then the PV-side voltage does not influence or impact the internal (ESS)-side DC bus voltage.

As shown in this example, when the power system is active and the PV disconnect switches are closed, the PV array, inverter, and battery are all connected to the DC bus. When rapid shutdown is initiated (by opening the switches 128), the PV disconnect switches are open. This disconnects the PV array from the ESS-side that includes the inverter and the batteries. In this case, there are now two DC buses to be brought down to below 30V in 30 seconds (to meet the requirements of rapid shutdown: the PV-side DC bus, and the ESS-side DC bus. The following are embodiments of reducing the voltages on the PV-side DC bus and the ESS-side DC bus.

In another embodiment, a button is pressed, causing a rapid shutdown command to be sent to the system. In this example case, the PV disconnect switches 128 are not physically opened, and the PV array is still connected to the inverter. That is, there is still logically a single DC bus in the system. To comply with rapid shutdown, the entire DC bus voltage is to be brought down to below 30V in 30 seconds. Embodiments of reducing the voltage on the DC bus (to which the PV array, inverter, and batteries are connected) will be described below.

ESS-Side Rapid Shutdown

In some embodiments, performing rapid shutdown includes turning off the inverter subsystem 106 and battery blocks 108 and 110, or otherwise entering a low voltage state. In some embodiments, the relays 118 are also opened, disconnecting the home system from the grid.

In some embodiments, there is internal, hard-wired communication between the inverter and the battery blocks (e.g., because they are placed in the same tower structure in some embodiments). For example, responsive to either the PV disconnect switches 128 being turned, or the E-stop button 132 having been activated, the system is commanded to enter the rapid shutdown state, and the inverter and at least some of the battery blocks are turned off. In some embodiments, when either PV disconnect switches 128 are opened, or E-stop button 132 is pressed, this is sensed or detected by a microcontroller in the inverter power board. The microcontroller of the inverter power board, in response to sensing the opening of the switches or the pressing of the E-stop button, shuts down the inverter (so that it is no longer producing output), and also sends a command to the batteries.

Figure 3:
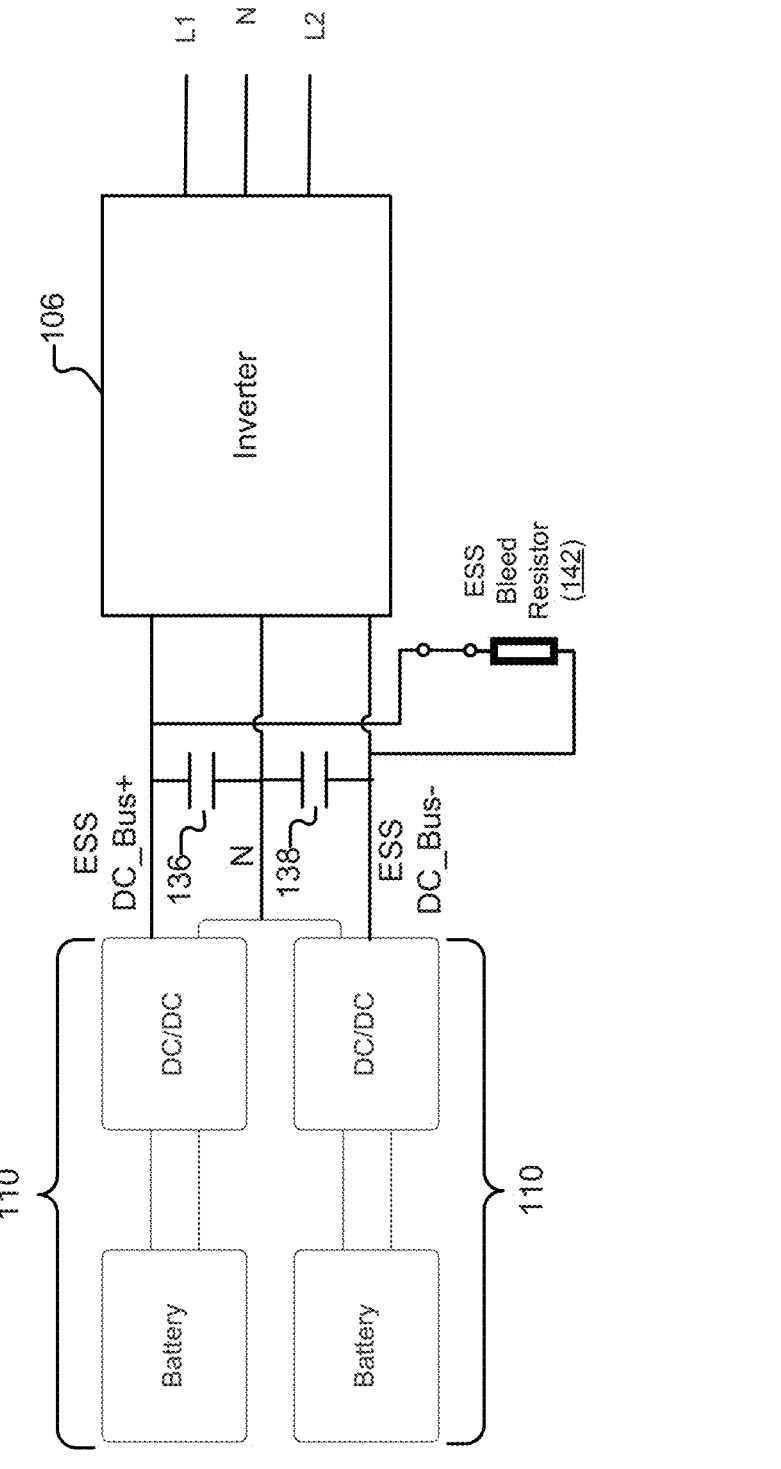
FIG. 3 illustrates an embodiment of an ESS-side of a power system.

FIG. 3 illustrates an embodiment of an ESS-side of a power system. In some embodiments, the ESS of FIG. 3 is an alternate view of the ESS-side of the system of FIG. 1. As described above, in the example of FIG. 1, the inverter is of a split DC bus architecture, where the DC/DC converter of one battery block is attached to half the DC bus (e.g., to the positive DC bus from DC_bus+ to N, or to the negative DC bus from DC_bus− to N).

In some embodiments, one battery block is left on to keep the bus at a threshold (non-zero) voltage that is below the 30V rapid shutdown requirement. For example, the battery block (via the DC-DC converter) is configured to keep half of the DC bus at 24V (or any other maintenance level voltage, as appropriate). That is, one of the half buses is powered up to 24V. Total bus voltage is 24 volts as well because the voltage across the other half will be 0V (and all of the 24V will be on one side of the DC bus). The voltage is applied, for example, in order keep components such as processors awake (in case, for example, there is no AC power available when the system is put back into normal operation).

For example, one battery block is kept operational to keep the bus at a maintenance voltage (e.g., 24 Volts) to power a controller. In some embodiments, having one of the battery blocks keep the DC bus at a maintenance voltage level is not required if there is still AC power available at the site (e.g., because the home has not been disconnected from the utility grid). If the site is still connected to the grid, then power needed to run the home energy system is sourced from the grid.

Discharging the ESS-Side DC Bus

As described above, in some embodiments, the voltage on the DC bus on the system side of the PV disconnect switch (e.g., ESS-side DC bus with inverter and battery blocks) is also brought down in rapid shutdown mode. For example, the DC link capacitors are large capacitances that must also be discharged during rapid shutdown (where the voltage of the DC bus is dependent on the amount of charge on the DC link capacitors (capacitors 136 and 138), and thus the DC link capacitors must be discharged in order to bring down the DC bus voltage).

In some embodiments, the ESS-side of the DC bus includes a discharge resistor 148 connected to a switch, where, as shown in the example of FIG. 1, the discharge resistor and switch are across the positive side of the DC bus and the negative side of the DC bus. In normal operation, the switch is opened. When rapid shutdown is initiated, the switch is closed (as shown in the example of FIG. 3), and the DC link capacitors are connected to the discharge resistor 148, causing the capacitors to discharge quickly.

One example of a discharge resistor is a PTC resistor (Positive Temperature Coefficient) resistor. The PTC resistor does not drain energy indefinitely. As the temperature of the PTC resistor increases, it stops conducting. That is, the PTC resistor is selected to only bleed so much energy before it becomes heated up, where it stops functioning when the temperature threshold is reached. With the PTC resistor, the resistance increases dramatically above a certain temperature, preventing the resistor from damaging itself. In some embodiments, the resistors are not directly connected to the capacitances. For example, in some embodiments, there is a switch between a bleed resistor and the capacitance. In normal operation the switch is open, and the bleed resistor is disconnected from a capacitor (and will thus need to discharge the capacitor). When the rapid shutdown is initiated, the switch is closed, and the bleed resistor is electrically connected to the DC link capacitor, causing the capacitor to discharge.

In some embodiments, the discharge resistor 148 on the ESS-side of the DC bus is sized so that they discharge the DC link capacitors much faster than the capacitors on the PV-side are discharged. (That is, the voltage on the ESS-side DC bus will drop faster than the voltage on the PV-side DC bus drops). For example, suppose that the PV disconnect switch is opened, but is then immediately closed. Because the PV-side optimizers have small capacitances, they will discharge very quickly. On the ESS-side, the DC link capacitors are much larger. If they are discharging slowly during that short period that the PV disconnect switch had been opened, then the ESS-side DC bus would still be close to 400V (or whatever the DC bus voltage had been just prior to PV disconnect), while the PV-side capacitances would have already gone down to below 30V. In this case, when the switch is closed immediately, then the PV-side and ESS-side DC buses are joined together, but with the ESS-side at 400V and the PV-side at 30V (e.g., low voltage to comply with rapid shutdown). Due to this large difference in voltage, there will be a large inrush of current from the large capacitances (e.g., DC link capacitors) of the ESS-side into the smaller capacitances of the PV-side, which could cause a great amount of damage to the PV-side optimizers. In some embodiments, the use of a more aggressive resistor on the ESS-side avoids this type of situation, where an intentionally lower resistance on the ESS-side is selected so that the DC link capacitors will discharge much faster than the PV-side capacitances will discharge. In this example, the voltage difference in which the ESS-side (with the large capacitances) is much larger than the PV-side (with small capacitances) is potentially problematic due to issues of damaging the smaller capacitances. A voltage difference in the opposite direction (with the PV-side being higher in voltage than the ESS-side) is not problematic, as the PV-side capacitances are relatively small and will not be able to dump a large amount of energy onto the large DC-link capacitances.

In this example, the PTC resistor accelerates how quickly the DC bus capacitances are discharged (and thus brings down the ESS-side DC bus voltage) so that they discharge more quickly than the PV-side, so that if the PV disconnect switch is suddenly closed again after opening, a large amount of power is prevented from being discharged or otherwise transferred to the small capacitances of the PV-side.

Resistors are but one example of types of loads that may be used to bleed off the capacitance on the DC bus.

PV-Side Rapid Shutdown State

The following are embodiments of bringing down the voltage of the PV-side of the power system in compliance with the requirements of rapid shutdown. In some embodiments, facilitating rapid shutdown includes each optimizer determining, individually and autonomously, that it should enter a rapid shutdown state. The following are embodiments of optimizer logic for detecting conditions for entering rapid shutdown, as well as embodiments of how an optimizer facilitates rapid shutdown when it is in the rapid shutdown state. Details and embodiments regarding exiting rapid shutdown are also described below. In various embodiments, the rapid shutdown techniques described herein are executed by rapid shutdown engine 224.

Detecting Whether Rapid Shutdown has been Initiated

The following are embodiments of logic utilized by a PV converter to determine whether it should enter a rapid shutdown state. In some embodiments, such logic is executed by rapid shutdown detection engine 226 of PV converter 200 of FIG. 2. As will be described in further detail below, in some embodiments, an optimizer determines that rapid shutdown has been initiated at least in part by detecting open circuit criteria. For example, a PV maximizer determines whether to enter rapid shutdown based on electrical measurements taken of its voltage and/or current output. In some embodiments, as will be described in further detail below, a PV maximizer enters rapid shutdown mode when it determines that, for at least a threshold amount of time, at least one of the voltages measured relative to at least one of its terminals is at one or more limits (e.g., per the voltage limiting logic described above), and that there is no sink for current. For example, the determination to enter a rapid shutdown mode based on detection of an open circuit is able to be performed regardless of how voltage is being limited (e.g., through determination of individual output voltage limit being reached, or string voltage limit being reached). That is, in some embodiments, an open circuit condition (from the perspective of an individual optimizer) corresponds to when the output current of the maximizer is near zero (or below a threshold), and the optimizer is voltage limited (e.g., a voltage limit has been reached, either between the output terminals, or from an output to the ground wire). In some embodiments, rapid shutdown of the optimizer will be triggered based on the optimizer autonomously determining that its current is near zero (or below a threshold), and it is operating at its voltage limit (either individual limit, or based on determination that string voltage limit is being met). That is, if each optimizer is limited in either of the voltage limit conditions (individual voltage output and/or string voltage limit), and that its output current is below a threshold, then each optimizer will independently detect the open circuit condition and enter a rapid shutdown mode.

As will be described in further detail below, the open circuit condition will be detected when either the PV disconnect switches are physically opened, or when the ESS (e.g., inverter and batteries) is shutdown in response to the E-stop switch (but is still physically connected to the PV array because the physical PV disconnect switch remains closed). In other embodiments, the system includes a relay, where the relay is opened when the e-stop switch is actuated, resulting in physical disconnection between the ESS and the PV array.

Suppose that the system had been operating normally, and that the PV converters had been operating in a normal operation mode. Suppose that rapid shutdown has been initiated by a person physically opening the PV disconnect switches 128. In this case, there are no loads available to draw current from the PV array (because the battery and inverter have been disconnected from the PV array, and power cannot be delivered back to home loads or the grid either).

Similarly, even if the PV disconnect switches are closed, but the E-stop button has been pressed (resulting in a virtual PV disconnect), there will also be no loads available to draw current from the PV array, because, as described above, the ESS will be turned off in response to initiation of rapid shutdown (and the inverter, batteries, DC car chargers, etc. that are connected to the DC bus are shut down). Further, even though the PV array will still be connected to the DC link capacitors in this case, the DC link capacitors will quickly charge up, and current will stop being drawn.

In either case, because of initiation of rapid shutdown, there will be a physical/electrical disconnection of loads to the PV array, causing an open circuit condition (either physical or virtual open circuit). Because there are no longer loads to draw current from the PV array, the voltage across each of the optimizer's outputs will continue to increase if there is sun (e.g., charge will continue to accumulate on the capacitors across each of the optimizers). However, because of the voltage limiting logic described above, when the voltages sensed using the voltage sensor of the PV optimizer reach either the individual output voltage limit (e.g., voltage 142 based, for example, on the PV optimizer using its voltage sensor to sense the voltage across its output terminals) or the string voltage limit (e.g., by measuring the voltage from one of its output terminals to the voltage reference ground (such as voltage 140 or 144), and determining that it is at least half of the string voltage limit value specified for normal operation), the PV converter will limit its current to 0 A (to match the 0 A of current being drawn out of the capacitors, thereby inducing net zero current, such that the charge on the capacitors will not increase). That is, if there are no loads to draw current from the optimizers (e.g., off of the PV optimizer capacitors), no current is put onto the capacitors by the PV optimizers either.

In some embodiments, if a PV converter determines, based on sensor measurements relative to at least one of its output terminals, that at least one of its voltage limits has been reached, and that it has been limiting its output current (e.g., current output is 0 A) for at least a threshold amount of time (to match that there are no loads to draw any current from the PV converters), then the PV converter is configured to conclude that it should enter rapid shutdown mode (because the detected open circuit condition is inferred or interpreted to have been caused by rapid shutdown having been initiated, and the PV array being physically and/or electrically disconnected from the ESS).

In some embodiments, each optimizer is configured to detect an indication of initiation of rapid shutdown (and enter rapid shutdown mode) when it has been limiting its output current for output voltage limiting (using the voltage limiting features described above) to a value <I_RS_Min (Rapid Shutdown minimum current, e.g., 200 mA, or any other current as appropriate) for a threshold number of seconds (e.g., 10 seconds, or any other time limit as appropriate that is less than the time requirement for rapid shutdown, which as one example is to bring the total string voltage below 30V within 30 seconds). In some embodiments, the value of I_RS_min is dependent on the measurement accuracy/precision of the current sensor.

Such techniques for rapid shutdown are compatible even if there is only an electronic disconnect (e.g., e-stop activation as described above). Thus, using embodiments of the techniques described herein, optimizers enter rapid shutdown mode when they limit their output voltage by using current less than a threshold minimum current for at least a threshold amount of time.

As shown in this example, criteria for detecting rapid shutdown involve detecting not only voltage railing (hitting a limit, where an optimizer is limiting its output voltage based on the individual voltage limit or the string voltage limit being reached) but also that the current is low or near zero. For example, detecting only voltage railing may be insufficient, as there may be points during normal operation in which the string voltage hits its overall limit, but the system is not in rapid shutdown. For example, if the power being drawn from the DC bus (e.g., by loads that are connected when in normal operation) is less than the power being generated by the PV panels (e.g., more power coming into the bus than going out), then the DC bus voltage would continue to rise, but the current output through the string (and thus the maximizers) would be non-zero. In this case, the PV converters should not be triggered to go into rapid shutdown mode, as there are still loads that are demanding power.

The following are example parameters for determining that a rapid shutdown condition or situation has occurred:

There is power available from the solar panels. The PV optimizers are able to push that power out.

but there is no demand for the power (and no sink for current), because the PV disconnect switches have been opened and/or the loads (inverter and batteries) have been electrically disconnected (by turning them off), and the PV-side DC bus is an open circuit.

because there are no loads to consume any power, the string of PV converters will rail the PV-side DC bus. For example, according to the string voltage limiting algorithm described above, the PV converters will either maximize their output voltage up to a programmed limit, or the voltage between one of the terminals and the reference ground is at a limit. That is, the voltage across the string of PV converters (and thus the PV-side DC bus) will be at the maximum allowed voltage (e.g., 550V in this example), and while the PV converters are able to deliver power, there are no loads to consume the available power.

In some embodiments, each PV converter is configured to make an individual determination of whether it is in a state where:

the PV converter is at a voltage limit (according to the voltage limiting algorithm described above that is running on the PV converter). This can be either the voltage across the output terminals of the PV converter and/or the voltage difference between one of the output terminals and the common reference voltage.

there is no power flow (output current) for a threshold amount of time. As one example, the determination that no power is flowing is based on a determination (e.g., using a current sensor) that no current is being outputted across the outputs of the PV converter (because an open circuit condition has been created by opening the PV disconnect switch, disconnecting the PV array from the rest of the home energy system, both physically and electrically, or there are no more loads on the PV array because the inverter and battery devices have been shut down). In some embodiments, the PV converter includes a current sensor to measure the current it is outputting. One example of a threshold is a number of seconds of no power flow.

If the two open circuit conditions are met (e.g., that the PV converter is at a voltage limit, and that the PV converter has not outputted current for more than a threshold amount of time), then the PV converter individually (and autonomously of other PV optimizers) determines or detects an open circuit condition, and automatically transitions from its normal mode of operation (e.g., a high voltage state) to a rapid shutdown state (e.g., a low voltage mode). In some embodiments, each PV converter performs this monitoring and detection locally and independently of the other PV converters. Further, the open circuit condition indicative of rapid shutdown having been activated is detected autonomously by a PV converter using its embedded sensors, and does not rely on explicit communications or signaling from other components in the system to indicate the occurrence of rapid shutdown.

As shown in the above examples, opening the PV disconnect switches and/or shutting down the inverters and batteries creates a situation in which there is no sink for current from the PV array, resulting in an (effective) open circuit situation. The optimizers are configured to detect the lack of output current (e.g., due to open circuit situation or no loads), and enter their rapid shutdown state accordingly.

Entering Rapid Shutdown Mode

As described above, in some embodiments, the PV converters are configured to limit their output voltages according to voltage limiting logic. In some embodiments, when the PV converters individually detect an indication that they should enter rapid shutdown (e.g., using the open circuit detection techniques described above), they enter rapid shutdown mode, which in some embodiments is a low voltage mode where the string voltage limiting algorithm is utilized with different voltage limits (as compared to when the system is active and in normal operation, or in a high voltage state). This includes specifying string voltage limits and individual optimizer output voltage limits for the rapid shutdown mode (that are different than those in the high voltage, normal operating mode). The individual autonomous actions of the PV converters according to the set of low voltage mode limits will cause the overall behavior of the PV converter string to bring down the voltage of the PV-side DC bus in a manner that complies with rapid shutdown requirements.

In some embodiments, performing rapid shutdown includes turning the PV converters (e.g., optimizers or maximizers) off or to a low voltage state (where in some embodiments the low voltage state is a non-zero output voltage, and in other embodiments, the low voltage state is where the converter is off and the output voltage of the maximizer is zero).

In some embodiments, the PV optimizers enter a low voltage state so that energy can be bled off. If they were left active and attempting to provide power, the string of PV converters would be putting out a large voltage (e.g., 550V across the PV-side DC bus, or upper limit of string voltage allowed), with power not being delivered anywhere (because there are no loads to draw current from the PV optimizers).

In some embodiments, when the PV converter enters a rapid shutdown state, the PV converter turns off or controls its output to low voltage mode limits.

In some embodiments, a PV converter turns itself off by turning off its internal switches used for power conversion. By turning off the power converter, no power can pass from the solar panel to the PV converter output, and the output voltage goes to zero.

In some embodiments, if the PV converter is deactivated and is no longer providing current, then the output voltage of the PV optimizer will drop due to the capacitor across the output of the PV optimizer (e.g., capacitor 232) discharging through a bleed resistor (e.g., a resistor such as resistance 234 that is in the voltage sensing architecture of the PV converter). The bleed resistor is specified such that the discharging of the capacitor will drop the voltage of the optimizer at a rate sufficient to bring the string voltage limit to below the 30V threshold within 30 seconds, per the requirements of rapid shutdown. As shown in the example of FIG. 1, in some embodiments, on the PV-side, a bleed resistor 146 is also placed across the PV-side DC bus. In some embodiments, the bleed resistor is also a load that is used to discharge the capacitances on the maximizers.

In some embodiments, instead of completely turning off the PV converter, the PV converter is still operational and kept active, but its voltage limits (according to the voltage limiting algorithm described above) are changed to limits for a rapid shutdown mode. For example, the overall string voltage limit is set to below the 30V rapid shutdown requirement (e.g., 24V). In this example, the string limiting algorithm is redirected from a limit of 550V (upper limit during normal operation) to a low voltage limit (e.g., 24V to remain below the 30V rapid shutdown requirement), where each individual optimizer will only allow its output voltage to be at a lower output voltage limit (e.g., 2.4V in a string of ten panels, rather than the 60V optimizer output voltage limit in normal operation), or allow the voltage between one of its output terminals and the common reference voltage to have a magnitude of 12V (half of 24V string limit voltage). The 24V string limit voltage is but one example of a string limit voltage value used herein for illustrative purposes, and other values for the string voltage limit may be used.

Thus, in some embodiments, when a PV optimizer enters rapid shutdown mode, it changes its voltage limits from normal operating mode (e.g., high voltage state) values to rapid shutdown mode (e.g., low voltage state) values. For example, in normal operation, the PV converter performs voltage limiting according to an individual optimizer output voltage limit of 60V, and a string voltage limit setting is 550V (so that the optimizers in the string will coordinate to collectively enforce a 550V limit). In rapid shutdown mode, a PV optimizer changes its own string limit setting to 24V, and its own individual optimizer output voltage limit to 2.4V. The PV converter then continues to execute the voltage limiting logic, but with the rapid shutdown mode values. For example, a maximizer reduces its output current if its individual output goes above 2.4V, or if the output between one of its terminals and the common reference voltage goes above 12V.

As shown in this example, the voltage limiting logic described above is reconfigured to comply with rapid shutdown requirements, where the PV optimizers, while operating individually, will ultimately collectively facilitate bringing down the voltage across the PV-side DC bus. In some embodiments, the overall string voltage limit is set to a value below 30V (the requirement for rapid shutdown). In some embodiments, the individual voltage output limit is set based on the number of PV optimizers in a string and the overall voltage limit. In this example, the individual voltage limit is set to 2.4V based on the overall voltage limit of 24V divided by the number of PV converters in the string (10 in this example), resulting in an individual limit of 2.4V per PV optimizer. Other limits may be specified for when operating in rapid shutdown mode.

In some embodiments, to comply with the requirements of rapid shutdown, the string limiting feature based on the ground wire (to limit the overall string voltage to a string limit voltage of, for example, 30V or less) is utilized, without specifying a specific individual voltage output limit on each maximizer. This would potentially result in, for example, the two middle optimizers having 15V on their outputs, with all other optimizer outputs being at 0V, fulfilling the requirement that the overall string voltage be less than 30V. Similarly, one optimizer may result in 30V on its output, with all other optimizers having 0V. As described above, in some embodiments, the maximizers are not programmed with individual specific output voltage limits. Instead, they are programmed to limit only the string voltage. As one example, the string voltage limiting function is set to 29V (below the 30V rapid shutdown requirement), where the individual output (e.g., between the positive and negative output terminals of the maximizer) is not necessarily limited. In this example, the maximizers will collectively limit the overall string voltage to the string voltage limit.

In some embodiments, the PV converter not only limits the individual output voltage of the optimizer to 2.4V (and prevents the optimizer output voltage from exceeding 2.4V), but operates to maintain that voltage level while in rapid shutdown mode (and not let it fall below the 2.4V value).

In some embodiments, the PV converter (via programming of its controller) actively reduces or forces its output voltage to be below the maximum limit by draining the capacitors such that there is a negative current that flows back into the solar panel.

In some certain cases, actively limiting the output voltage to a low voltage limit may create imbalances in output voltages of the optimizers of the string. For example, suppose that the system is reconnected, and the batteries are on. Suppose that when the batteries are on, they operate to raise the DC bus voltage to a nominal voltage of, for example, 400V. Suppose that there are eight optimizers in a string, and five of them are on and actively attempting to limit their voltage to a low voltage limit of, for example, 1V (e.g., by drawing negative current), while the remaining three optimizers are asleep. This would cause there to be 5 volts across the outputs of the five optimizers that are actively limiting their output (and opposing the increase in voltage on the DC bus), while the remaining three optimizers would have 395V across their outputs (400V-5V). This could be potentially damaging to the three sleeping optimizers (if they are not designed to handle such high voltages).

In some embodiments, to avoid such scenarios, rather than actively limiting the PV converter's individual output voltage to the low voltage limit, when the PV converter's individual output goes above the maximum voltage limit, the PV converter is instead programmed to deactivate, where its output voltage is passively reduced by allowing the output capacitor of the PV converter to discharge through the bleed resistor. In this way, negative current will not be drawn. In some embodiments, the above deactivation or pausing of the operation of the PV converter is also performed if a maximum voltage limit relative to the ground wire is exceeded.

As one example, if the voltage goes over a limit, then the PV converter deactivates (or otherwise pauses operating), allowing the capacitor to discharge through the bleed resistor, thereby reducing the optimizer's output voltage. Other voltage limits (e.g., 1V) may be utilized as appropriate.

In some embodiments, the controller of a PV converter is programmed to prevent negative current. As one example control scheme, a switch of the PV converter is left in an off state until current is safely above a measurement tolerance, thereby causing the PV converter to behave in a manner similar to a diode, preventing negative current. At higher voltages (determined according to a threshold voltage), the switch may be operated normally. For example, negative current is avoided unless the output of the PV converter is at a high voltage (e.g., 60V).

As described above, in some embodiments, the PV converter (attempts to) limit the individual output voltage of the optimizer to a maximum allowed output voltage for rapid shutdown mode (and prevents the optimizer output voltage from exceeding a maximum of, for example, 2.4V).

In some embodiments, the PV converter is also programmed, when in rapid shutdown mode, to prevent the output voltage of the PV converter from falling below a minimum voltage level. As one example, the minimum voltage level is the same as the maximum voltage level (and is thus a voltage level that is maintained) For example, if it is detected that the optimizer output voltage is below 2.4V, then the PV converter turns on and outputs current (which will charge up the optimizer's capacitor) until the output voltage is sensed to be the minimum voltage level 2.4V. The minimum voltage level may be, but need not be, the same as the maximum allowed output voltage. For example, the maximum allowed voltage level may be 2.4V, and the minimum allowed voltage level may be 1V. As described above, in some embodiments, the PV converter operates to keep the output voltage above the minimum voltage limit. For example, if it is detected that the optimizer output voltage is below the minimum rapid shutdown mode voltage limit, then the PV converter turns on (assuming there is solar power) and outputs current (which will charge up the optimizer's capacitor) until the output voltage is sensed to be at or above the minimum voltage limit. If the output voltage goes over the maximum voltage limit, then the PV converter deactivates, allowing the capacitor to discharge through the bleed resistor, thereby reducing the optimizer's output voltage to be below the maximum voltage limit. In some embodiments, setting a minimum voltage allows a deterministic mechanism by which to control the order in which optimizers turn off (or come back on). For example, this can be used to enforce that the top few and bottom few optimizers are being voltage limited, and the middle optimizers have a larger output. When an entity starts to draw current (implying that the system is back on), this will cause the DC bus voltage to reduce, and the innermost optimizers will come off their limits first, ensuring that the optimizers in the middle of the string are the ones at a higher voltage and are not limited, while optimizers being limited are at the ends of the string. In this way, the reactivation sequence is deterministic (e.g., from innermost optimizers to outermost optimizers).

In other embodiments, the maximizers, in aggregate, limit the string voltage to 24V. In some embodiments, the PV-side is configured to maintain the low voltage intentionally, as part of, for example, wake-up logic. For example, when the system is not in rapid shutdown, the system becomes aware that there is sun available when the DC bus is not 0V. If the PV powers up the bus to 24V, the system detects this and infers that the sun has risen. Further details regarding exiting rapid shutdown mode are described below.

The following are further details regarding bringing the PV-side bus down when in rapid shutdown mode. In this example, suppose that in rapid shutdown mode, the individual limit voltage is 2.4V, and the overall string limit setting is 24V. When in rapid shutdown, the PV optimizer measures its output voltage using its voltage sensor. If the voltage is above 2.4 volts, then the PV converter shuts down. If the voltage is below 2.4V, then the PV converter allows its own capacitor to be charged up to 2.4V, at which point it shuts down.

In other embodiments, the optimizer output voltage is allowed to go to 0V, which may occur, for example, for the top optimizer in the string, if the voltage between its positive output terminal and the reference voltage is 12V.

In some embodiments, the PV optimizer includes a bleed resistor (e.g., as part of its voltage sensor) that bleeds down the charge on the small capacitor across the output of the PV optimizer. The bleed resistor bleeds the charge at a rate fast enough to comply with the 30-second rapid shutdown requirement. In some embodiments, the PV discharge resistance 146 is also used to discharge the maximizer capacitors to be below the 30V limit within 30 seconds for rapid shutdown.

In the above examples, the PV converters do not actively pull their output voltage down. Rather, they wait for the voltage to come down to the individual limit of 2.4V, and then, in some embodiments, attempt to maintain the 2.4V limit (e.g., by allowing the capacitor to charge up until the measured voltage is 2.4V. If it increases, then charge will bleed off via the bleed resistor). That is, if the voltage of the output of the PV converter is below 2.4V, then the PV converter is configured to top off the capacitor with available solar power until 2.4V is reached, after which it stops providing current (where the individual output is allowed to increase so long as the voltage to the reference is within the 12V limit). That is, in some embodiments, the PV converters, in rapid shutdown mode, wait for the output voltage to fall below the 2.4V limit. If the output falls below 2.4V, then the PV converter generates more output power so that its output voltage can rise up to 2.4V. In some embodiments, the bleed resistor is across the capacitor itself. In some embodiments, the bleed resistor is made up of a voltage-divided chain across the capacitor that is used for voltage sensing.

If there is PV power, then the PV converter will keep its output up to a limit of 2.4V, as described above (e.g., by charging up the output capacitor or letting it discharge through a bleed resistor). If the sun goes down, then the PV converter would be unable to charge up that capacitor, and the output voltage would bleed down to 0V without the PV converter being able to be brought back up.

In some embodiments, to fulfill the requirements of rapid shutdown, the optimizers collectively operate to reduce the overall string voltage to be below the rapid shutdown specified string voltage limit. While the optimizers will work to collectively bring the overall string voltage limit, as described above, the individual output voltages of the optimizers may be limited or controlled in a variety of ways. For example, as described above, in some embodiments, when in rapid shutdown mode, an optimizer is programmed to shut off. Its output voltage is then zero. In other embodiments, when in rapid shutdown mode, the optimizer is programmed to have an output voltage that is above a non-zero minimum voltage limit. Having a non-zero minimum voltage is beneficial in various scenarios. As one example, the non-zero minimum voltage is beneficial to keep controllers powered, even if the grid is unavailable, which would allow the controller to make decisions and, for example, detect when rapid shutdown is over (this is applicable in the case where rapid shutdown had been initiated via the E-stop button, where the controller is still connected to the PV array via the DC bus).

Figure 4:
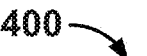
FIG. 4 is a flow diagram illustrating an embodiment of a process for facilitating rapid shutdown.
Figure 4:
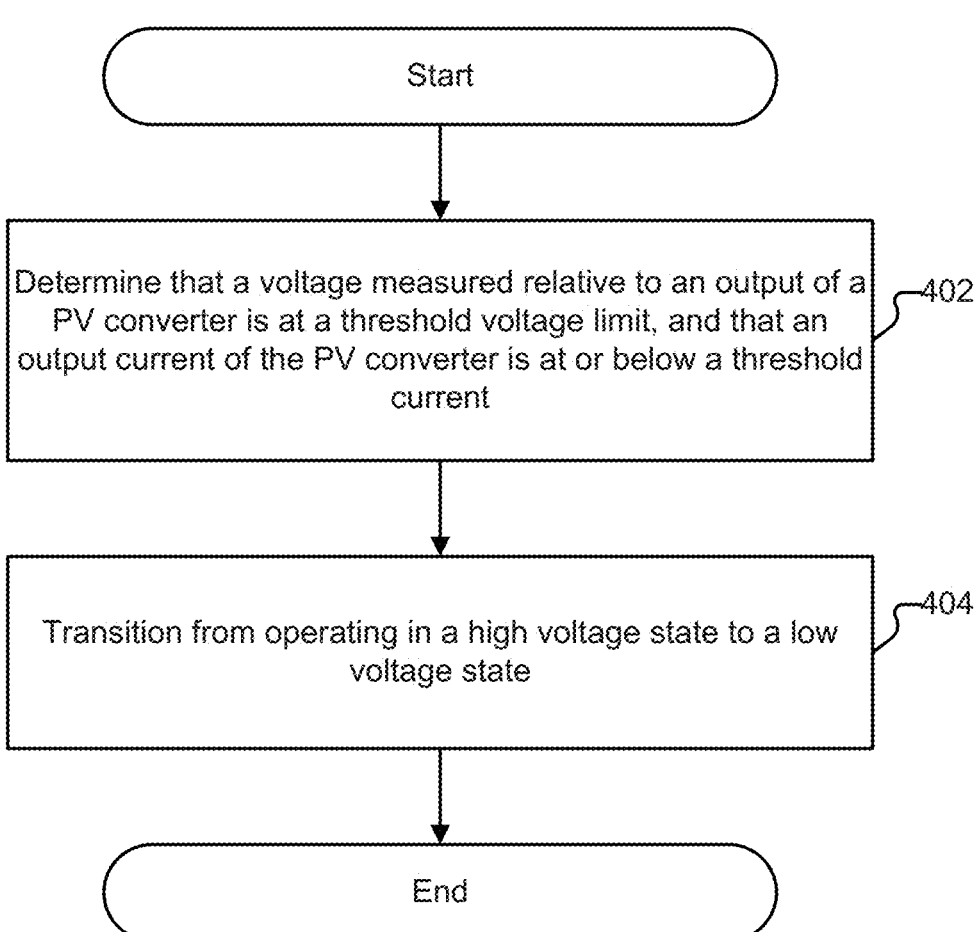

FIG. 4 is a flow diagram illustrating an embodiment of a process for facilitating rapid shutdown. In some embodiments, process 400 is executed by a PV converter, such as a power optimizer or maximizer coupled to a photovoltaic panel (e.g., PV converter 200). The process begins at 402 when it is determined that a voltage measured relative to an output of a PV converter is at a threshold voltage limit, and that an output current of the PV converter has been at or below a threshold current for at least a threshold amount of time.

At 404, in response to determining that the output voltage of the PV converter is at the threshold voltage limit, and that the output current of the PV converter is at or below the threshold current, the PV converter is configured to enter a rapid shutdown mode. For example, the PV converter transitions from operating in a high voltage state to a low voltage state. In some embodiments, entering rapid shutdown mode includes changing operating voltages limits of the PV converter (e.g., changing the string limit setting and individual output limit to low voltage values, as described above).

For example, using process 400, the DC/DC converters that connect the panels to the DC bus are configured to detect that the load has been disconnected from the bus, based on the DC bus no longer acting as a current sink. In response, the DC/DC converters connected to the panels reduce their output voltages, maintaining the DC bus at a standby level.

As described herein, a PV converter enters rapid shutdown mode when it determines open circuit criteria, or that there is otherwise no sink for current detected, where in some embodiments the open circuit criteria include that the PV converter is at its voltage limit, and has zero output current for at least a threshold amount of time. As described above, each PV converter is configured with a voltage limiting feature that either limits the PV converter's voltage relative to the ground node shared by the optimizers in the string (e.g., based on string voltage limit), or the PV converter's output voltage across its output terminals (e.g., optimizer output voltage limit). If the PV converter is voltage limiting AND its current is zero (and has been zero for a threshold amount of time), then rapid shutdown is entered, because it means that the PV converters have power to operate, but the system is in rapid shutdown, and the PV-side of the DC bus needs to be de-energized. In some embodiments, having the voltage limit criteria described herein also prevents the PV converters from entering rapid shutdown because there is little to no sun (in which case the current would also be low or zero, but since the voltage is also zero, then the voltage limit criterion is not met, and the PV converters will not drop into rapid shutdown).

The following is another example of facilitating rapid shutdown. Suppose the home energy system shown in the example of FIG. 1 is operating in its normal mode. In this example, suppose that the system typically operates in the 400V range. For example, the system (DC bus) is at or about 400V because the batteries are configured to take out power put on the bus in a manner that maintains approximately 400V on the bus. If the PV panels suddenly put a large amount of power on the bus, the DC bus will go up (because the power delivery will involve current being placed on the DC link capacitors, where the increased amount of charge on the capacitors will raise the voltage on the capacitors, and therefore increase the voltage across the DC bus). In some embodiments, the batteries sense the voltage increase on the DC bus, and immediately draw power from the bus (e.g., by drawing current from the DC link capacitors to charge up the batteries, if the batteries are not yet full). As charge is removed from the DC link capacitors, their voltage drops, thereby dropping the voltage across the DC bus. In this example, suppose that the drawing of power by the batteries occurs in a manner such that the DC bus voltage will settle to an equilibrium of approximately 400V. As described in this example, in the normal mode of operation, the more power the PV array is producing, the higher the bus voltage will be. For example, the DC bus voltage may rise to 420V or 430V if there is a large influx of PV power (where, for example, the increase in power is greater than the consumption of power). In some embodiments, the rising of the DC bus above 400V allows the charge controllers of the batteries to charge up the batteries (and thereby take charge off the DC link capacitors and reaching the aforementioned equilibrium).

As described above, the optimizers sense voltage on their output. Suppose, for example, that there are 10 optimizers in the string. If each optimizer is producing the same amount of power, then the DC bus voltage will be equally spread out across the outputs of the optimizers. For example, each PV converter would see approximately 40V. If the maximizers are producing different amounts of power, then they will see different voltages on each of their outputs. Based on the string limiting algorithm described above, the PV converters will be at or below their voltage limits. For example, a PV converter may be at its limit during normal operation due to shading on some panels. For example, if three or four of the panels were severely shaded, then the unshaded panels may end up outputting their voltage up to the maximum limit (e.g., 60V in this example) (where, for example, in order to maximize the power delivered output, the PV converter may need to output to 80V, but is capped at going up to 60V).

Some of the PV converters may be at their voltage limit, and some may not be. If the batteries are not full, they will continue to draw current from the DC bus. That is, there is current flowing on the DC bus, and there will be current through the string of PV converters.

Suppose that a command for rapid shutdown occurs (e.g., because a firefighter turned the PV disconnect switch, or pressed the emergency stop button). If the PV disconnect switches are opened, the PV array is separated from the ESS (inverter and battery blocks). In both the cases of opening the PV disconnect switch, and pressing the emergency stop button, the battery blocks and inverter are instructed to no longer take any power, as described above. At this point, there are no components on the DC bus that will accept any power. However, if the sun is still up, then all of the power the PV converters are producing will spill into the PV-side of the DC bus (e.g., charge up the capacitors on the bus), but there are no loads drawing the charge off the capacitors (no current is flowing) because the inverter and batteries are off, and/or opening of the PV disconnect switch creates an open circuit condition that isolates the PV array from any potential consumers of the PV power being generated, which drives the DC bus voltage higher and higher.

In the case of rapid shutdown, because the inverter and battery are not drawing current (wherein the case of opening the PV disconnect switches, the PV array is physically disconnected from the ESS-side of the DC bus), there is no path for current to flow. In this case, the voltage across the optimizer string will continue to rise until the string limit setting is reached (e.g., 550V in this example). For example, once the DC bus voltage across the optimizer string reaches the string voltage limit setting, the PV optimizers will begin to limit their voltages (by limiting their output current) so that the overall voltage on the PV-side DC bus cannot exceed the string voltage limit setting. For example, the optimizers may be limiting to individual voltage limits. In this case, the PV string voltage is at its maximum, and current is zero. Here, even if the sun is up and there is power available from the solar panels, there is no current being outputted (and no power being delivered). Each optimizer autonomously and independently determines (by making various electrical measurements relative to at least some of its output terminals) that the two conditions for entering rapid shutdown are met: they are at their voltage limit, and there is no current (for at least a threshold amount of time). The optimizers then enter rapid shutdown mode.

For example, in the case of rapid shutdown by opening the PV disconnect switches, the PV-side DC bus will be an open circuit. Even if the voltage on the PV-side of the DC bus were not at 550V before rapid shutdown was initiated, it will very quickly increase to 550V, as the capacitors on the outputs of the PV optimizers are relatively small, and their voltage will increase quickly as they are charged up from any available solar power. The PV optimizers will then hit their voltage limit, at which point the net PV maximizer current will also go to zero, in which case the conditions for entering rapid shutdown (zero current and voltage limit being reached) will be met, and the PV optimizer logic will enter a rapid shutdown mode (e.g., low voltage mode) of operation, as described above. In the case of the emergency stop button being pressed, where rapid shutdown is initiated without opening the PV disconnect switches, there is a single DC bus to which the PV array, inverter, and batteries are connected, and the turning off of the inverter and batteries will cause any current from the PV array to charge up the capacitances on the DC bus (e.g., optimizer output capacitances and the DC link capacitors), thereby increasing their voltage (because there are no loads to draw charge off of those capacitances), which in turn increases the overall string voltage. The maximizers, at potentially different points in time, will reach some voltage limit, and will reduce their currents to prevent the individual output voltage and/or voltage to the common reference to exceed the corresponding limits.

The following is an example of performing string limiting. In some embodiments, the optimizers collectively limit the overall voltage of the optimizer string by measuring their own individual voltage to a common ground or reference voltage, as well as their own optimizer output voltage (across its own output terminals).

If any of the optimizers sees a voltage relative to ground that is greater than half of the 550V string limit setting, then they limit their own output voltage to stay below that 275V limit. By doing so, the optimizers at the top and the bottom of the string will end up limiting themselves to zero, while the optimizers in the middle will hit their individual limit setting of 60V. The optimizers in a string are not necessarily following the same limit at the same time. For example, the string limiting algorithm logic will cause the optimizers at the end to limit themselves according to one type of limit (e.g., half string limit to ground), while the other optimizers in the middle of the string will also be limiting themselves, but to a different type of limit (e.g., their individual limit).

As one example, the optimizers in the middle of the string will be maintaining their individual output voltage at the maximum allowed limit of 60V. The maximizers at the ends will have an output of zero volts. Other intermediate maximizers may be operating at other voltages, such as 12V (and not necessarily at either of their limits).

The following are examples of different types of limits that can cause voltage limiting:

individual output voltage at output voltage limit (e.g., 60V);

string voltage limit between maximizer's individual positive output terminal and the negative side of the PV-side DC bus—this will occur for the maximizer at the "top" of the string (e.g., maximizer 124), depending on string length;

voltage greater than half of string voltage limit between GND and individual positive output terminal (occurs for maximizer at "top" of string, depending on string length); and voltage between negative side of the PV-side DC bus and GND drops below ~20V (occurs as maximizer's pull down resistor pulls maximizer Vout<=1V).

In some embodiments, when in rapid shutdown mode, each optimizer opens all switches and remains in the rapid shutdown mode until the criteria for exiting this state are met. Further details regarding exiting rapid shutdown are described below.

Exiting Rapid Shutdown Mode

In some embodiments, each optimizer stays in the rapid shutdown mode state until the criteria for exiting the rapid shutdown state are met. The following are embodiments of exiting rapid shutdown state. In some embodiments, rapid shutdown exit engine 230 is configured to perform exiting of an optimizer from a rapid shutdown state.

In some embodiments, optimizers exit rapid shutdown mode when their output voltage has dropped below a threshold voltage for a threshold amount of time (e.g., 5V for 30 seconds), and then subsequently has been above a threshold voltage for a threshold amount of time (e.g., 12V for 30 seconds). For example, the voltage will go above 12V when the batteries drive the bus voltage up to a nominal voltage after rapid shutdown mode is cancelled.

The following are embodiments of bringing the DC bus voltage up after rapid shutdown mode has been cancelled. Suppose that the system had been in rapid shutdown mode, and that rapid shutdown has now been ended. If the PV disconnect switches had been opened, and have since been closed, then the PV-side and the ESS-side are now physically and electrically connected as if a single DC bus. If the emergency stop had been pressed, then this can be reset. In either case, in some embodiments, in response to cessation or conclusion of rapid shutdown, the inverter and batteries are commanded to exit rapid shutdown.

In some embodiments, when normal operation resumes (and the PV disconnect switches are closed, electrically connecting the battery, inverter, and PV array, or the E-stop button is pressed again or canceled, causing the inverter and batteries to be turned on again), the battery blocks or the inverter (using AC power converted to DC) is configured to bring the DC bus voltage up. If the system is not connected to the grid, then the battery blocks are used to bring the grid voltage up.

In this example, there is not explicit signaling to the optimizers that rapid shutdown has ended when a user deactivates rapid shutdown. In some embodiments, the optimizers, based on electrical measurements taken relative to their output, autonomously determine whether rapid shutdown mode has been deactivated, and whether they should transition from the low voltage mode they are currently in, to a high voltage state for normal operation.

In this example, the optimizers are in rapid shutdown mode, and are waiting for the DC bus voltage to be driven up so that they can exit rapid shutdown mode and enter normal operation. The following are embodiments of detecting an increase in bus voltage for exiting rapid shutdown mode.

In the above, when an open circuit situation is detected (which would occur when rapid shutdown is initiated), the PV connectors enter a low-voltage but active state. Having the PV converters operate in a low-voltage but active state is beneficial for being able to start up the system without requiring communications. For example, having the PV converters be in a low voltage but active state allows for the system to be started up when there is no AC power, and little charge in the batteries.

As another example, in some embodiments, PV converters start up in a rapid shutdown state until they confirm that they are not in a rapid shutdown context or scenario. For example, suppose that the optimizers are first "waking up" in the morning (and the sun is shining, and power will be generated). If rapid shutdown had been initiated in the middle of the night, but the converters had not been on at the time to detect that they should be in rapid shutdown, then they should be prevented from railing the PV-side DC bus just because the sun came up. In some embodiments, to avoid this, PV converters are started up in rapid shutdown mode. The techniques described herein may be executed by a PV converter to autonomously and independently determine that it is permitted to activate.

In some embodiments, the PV converter exits its low voltage mode if it determines that the voltage on the PV array bus (e.g., by measuring the voltage between one of its output terminals and the common reference voltage, or the voltage across its outputs) is higher than what it is trying to limit the voltage to (based on being in rapid shutdown). For example, if the PV converter is attempting to maintain its voltage to be at or below 2.4V, or the voltage from an output terminal ground to be at or below 12V, but it is measuring a higher voltage such that one or both of its rapid shutdown limits are being exceeded, then this means that some other component is raising up the voltage of the bus to which the PV array is connected. That is, it is either the inverter and/or the battery that is bringing up the bus, and thus the system is not in rapid shutdown. Thus, if a PV inverter is in rapid shutdown, and detects that its optimizer output voltage (either individual output voltage, or voltage relative to ground) is greater than the rapid shutdown low voltage optimizer output voltage limit, that voltage between its positive terminal and ground (or between ground and its negative terminal) is greater than half of the rapid shutdown low voltage string limit, then the PV inverter determines that rapid shutdown is no longer in effect, and exits the rapid shutdown state (e.g., transitions from the low voltage mode to a high voltage normal operation mode).

That is, if the voltage relative to at least one of the output terminals of the PV converters is high (above either the limit based on string voltage, or the limit across the output terminals), this indicates that they are able to exit rapid shutdown mode, because if the bus voltage is high, it is because rapid shutdown is not in effect, in which case the PV array is connected to the ESS-side, and the ESS-side is being allowed to operate normally, where it is one of the inverter and/or the batteries that is bringing up the DC bus voltage such that the limits of the PV converter when in rapid shutdown mode are being exceeded. In this example, the PV converters are initially in a rapid shutdown state (e.g., because rapid shutdown had been initiated, or because they are starting up and initialized to rapid shutdown state by default), but exit it once normal operating conditions are determined (which is based on other components bringing the DC bus voltage up).

The following are further embodiments of programming of a controller of a PV converter to autonomously determine when to switch or transition the operational state of the PV converter from a rapid shutdown state to an active state of operation. In some embodiments, the transition is triggered in response to the PV converter determining a state of the DC bus, where the state of the DC bus is indicative of whether the solar battery system is operational (and not in rapid shutdown mode). In one embodiment, each maximizer is provided a string voltage sensor, which is configured to read the string voltage (which is the DC bus voltage). If the string voltage is above a threshold, then this indicates that the solar battery system is operational. However, including string voltage sensors in maximizers may be expensive and complicated. The following are additional embodiments of inferring or detecting whether the DC bus is up (e.g., DC bus voltage is above a threshold due to solar battery system being in an operational state and thus a source of energy that is trying to bring the DC bus up).

In some embodiments, the PV converter monitors for one of three below conditions to determine that the DC bus is up, and to trigger switching from a rapid shutdown state to an active state:

1. The output voltage on the PV converter's capacitor (between the positive and negative output terminals) going up above or exceeding a certain threshold (e.g., 40V, or any other threshold as appropriate)—this amount of voltage across the PV converter's capacitor indicates that the DC bus has been charged up (which is inferred to be due to the ESS being operating again, which would imply that the solar battery system is no longer in rapid shutdown).

2. The voltage relative to ground (between ground and one of the positive or negative output terminals) being above a threshold (e.g., greater than +/−20V, or any other threshold as appropriate). This indicates that the DC bus voltage is at least 40V (double the threshold, and above the 30V requirement for rapid shutdown), as the DC bus is grounded in the middle in some embodiments, where the grounding wire allows the PV converter to determine the voltage relative to ground, as described above. If this condition is determined, that the DC bus voltage is above the maximum rapid shutdown voltage threshold, then this indicates that the solar battery system is up (as only the batteries or inverter could be bringing the DC bus voltage up). In this example, the PV converter compares its ground voltage measurement to a threshold, and wakes up and becomes active if the ground voltage measurement is determined to be above the threshold.

3. Positive current above a threshold is detected in the output. Because the optimizers in a string are connected in series, the string current flows through each optimizer. However, each maximizer has a current that it is outputting into its output capacitor, internally. If that current is above the string current, then its output voltage will increase, because the string current is draining the capacitor more slowly than the optimizer is filling up the capacitor. Vice versa, if the optimizer is pumping current into the capacitor at a rate that is less than the string current, then its capacitor voltage will go down.

In some embodiments, each optimizer has a sensor that measures string current. If the string current is active (and in some embodiments, the threshold amount of string current is detected for a threshold amount of time), the maximizer will detect this, even if the maximizer is not active (as in rapid shutdown state), and will wake up (and go into an active state).

Different optimizers in the string may wake up based on detection of different conditions, at different times.

In other embodiments, maximizers wake up when detecting a current source. For example, in some embodiments, not only are the maximizers, when in rapid shutdown mode, programmed to keep the voltage down below a certain limit, but are also programmed to resist or keep the voltage from increasing beyond the limit, even if the batteries are trying to bring the bus voltage up (e.g., there is a source of energy trying to bring the DC bus up). For example, as part of the resisting, the maximizers are configured to remove charge from their output capacitances, such as by dissipating power into their connected PV panels. This will result in a measurable negative current in the maximizer string. If the current they are attempting to absorb is at least a threshold amount of negative current for a threshold period of time, then this is an indication that the DC bus voltage has been raised. That is, in some embodiments, any time that the DC bus is charged up, the maximizers are programmed to hold their individual voltage limits down by sinking up to a certain amount of current (e.g., half an amp) for a certain amount of time. For example, if negative half of an amp current is detected for 10 seconds, then this is an indication that the DC bus is up (because otherwise there would not be a source of current that is charging up the output capacitors and raising their voltage), and the maximizers wake up (because, for example, there must be some other component of the system that is providing current to the output capacitor, which must be drawn off by the maximizer to keep its output voltage from increasing beyond a limit). (In some embodiments, the maximizers are designed to, when sleeping, protect against negative current) For example, instead of limiting the output voltage below a threshold, if another component attempts to bring the voltage above the threshold (which would be caused by some current source putting charge onto the output capacitors and raising their voltage), the maximizer will try to hold it to the limit, and in order to do so, the maximizer is allowed to draw negative current (e.g., in an attempt to take charge off the capacitors and reduce their voltage). If the batteries, because the system is operational, are acting as a current source with respect to the PV maximizers, then the maximizers in the string will resist the attempt by the batteries to charge up the DC bus (by absorbing or sinking current) until all of the maximizers are awake. That is, a maximizer wakes up when it is unable to sink sufficient current to bring its output voltage (either individual output voltage or voltage to reference ground) to be below a corresponding limit within a threshold amount of time. In this example, the PV maximizer wakes up when a large current source is detected. The current source is detected by the PV maximizer determining that it is sinking current (e.g., into the PV panel) in an attempt to keep its output voltage to be below a voltage limit. If there is a sustained effort to remove current from the output and put it back into the PV panel, and the output voltage is still not decreasing, then this is an indication that there is some other current source that is charging up the output (because, for example, there is more current into an output capacitor than the maximizer can take out), which in turn indicates that the DC bus is back up. The PV maximizer then wakes up.

The following are embodiments of bringing up the voltage of the DC bus. For example, the techniques described herein are used when transitioning from the system being in rapid shutdown to operating in a normal operation mode (e.g., high voltage mode), where the PV array and ESS are connected together (PV disconnect switches 128 are closed).

Using Grid Power to Charge up the DC Bus

In some embodiments, if there is grid power available, the inverter uses the grid power (e.g., by converting AC power to DC power) to charge up the DC bus (e.g., by charging up the DC link capacitors, upon which the DC bus voltage is based).

In many cases, the system will be connected to the grid, and the inverter can use power from the grid (by converting AC power to DC) to bring up the bus voltage (e.g., by charging up the DC link capacitors across the DC bus). In this case, where AC power can be used, the DC battery need not be used to bring up the DC bus.

For example, the inverter is configured to convert AC power at its output to DC power, which is used to (pre-) charge the bus from the inverter side. AC power may be used to bring up the DC bus even in cases where the battery blocks do not have sufficient reserves of power to charge up the DC bus.

Using a Battery to Charge up the DC Bus

In other embodiments, such as if the system is not grid tied (and there is no grid power that can be used to bring up the bus), then the system is brought up by a battery block (which in this example is the only remaining energy source for bringing up the DC bus to a level that would result in the optimizers autonomously determining to exit rapid shutdown). In some embodiments, as described above, one battery block may be kept operational to bring the bus voltage back up. The optimizers, in response to detecting the DC bus being raised (by the battery block), then exit the low voltage mode they are in.

Bringing up the voltage of the DC bus requires that a battery block have sufficient energy to do so (e.g., to charge up a DC link capacitor to raise the voltage of the DC bus). However, if the battery blocks are used to bring the DC bus voltage up, care should be taken to not increase the voltage on the bus (e.g., to 400V, which is their normal operating point) when the sun is not yet up, as the PV converters would not be on to detect the raising of the DC bus voltage. For example, in some embodiments, the PV converter derives its power from the solar panel. In the middle of the night, when there is no solar power (because of no sun), the PV converters are off. When the sun begins to shine, the solar panels generate power, and the PV converters power on ("wake up"). For example, when there is no sun, the output voltage of the PV panel is 0V. The output of the PV panel is coupled to the input of the PV converter. When there is 0V output from the PV panel, the PV converter is off. When sun begins to shine, a voltage difference is generated across the outputs of the PV panel, and the voltage across the inputs of the PV converter is therefore increased. With the voltage across its inputs, the PV converter turns on.

As one example, suppose that the batteries had only a small amount of reserve charge to bring the DC bus up once, in which case the batteries would discharge to bring up the bus voltage, and then run out of charge. If the PV converters were off during that time, then they would not be able to detect the electrical behavior relative to their outputs that would be indicative of the bus charging activity. The bus voltage would then decrease back to 0V. In some embodiments, when the sun is up, the PV converters start or wake up in rapid shutdown mode, at which point they then wait and monitor for the DC bus voltage to be raised (so that they can determine that they can transition out of rapid shutdown mode). However, because the battery blocks no longer have any charge to do so (and there is no grid in this example, so there is no AC power for the inverter to use to charge up the DC bus), the PV converters will continue to be stuck in the rapid shutdown mode, with no other energy source available to pre-charge the bus in a manner that would allow the PV converters to autonomously exit the rapid shutdown mode that they started in.

In some embodiments, a battery block is controlled to keep a minimum amount of reserve charge for charging up the DC bus to wake up the PV converters. In some embodiments, the battery block does not use up this reserve charge to bring up the DC bus until it detects an indication that the sun is up. In some embodiments, the battery block infers that the sun is up by detecting that the voltage on the DC bus is at the low string voltage output limit of the low voltage mode of the PV string. For example, if the system is no longer in rapid shutdown, then the PV array is electrically connected to the inverter and battery blocks on the DC bus. In the middle of the night, the PV optimizers are off (and the output voltage of the PV converters is 0V, regardless of what mode the PV converter is operating in), the battery block DC-DC converter is off (although the DC-DC converter maintains the reserve charge described above), and the DC bus voltage is 0V. When the sun rises, the PV optimizers wake up and start up in rapid shutdown mode, bringing up the string voltage to the maximum low voltage mode limit of 24V. Because the system is not actually in rapid shutdown (but the optimizers are operating in rapid shutdown mode), and the PV-side DC bus and the ESS-side DC bus are electrically connected, the DC-DC converter of the battery block with the reserve charge is able to detect (via a voltage sensor at its output) the 24V on the DC bus to which it is connected (or 12V if it is connected to half of the DC bus).

As another example, to fulfill the requirements of rapid shutdown, the optimizers collectively operate to reduce the overall string voltage to be below the rapid shutdown specified string voltage limit. While the optimizers will work to collectively bring the overall string voltage limit, as described above, the individual output voltages of the optimizers may be limited or controlled in a variety of ways. For example, as described above, in some embodiments, when in rapid shutdown mode, an optimizer is programmed to shut off. Its output voltage is then zero. In other embodiments, when in rapid shutdown mode, the optimizer is programmed to have an output voltage that is above a non-zero minimum voltage limit. Having a non-zero minimum voltage is beneficial in various scenarios.

For example, having a non-zero minimum voltage is beneficial for a black start scenario. For example, suppose that the home system is off-grid, there has not been sun for several days, and the batteries have entered a sleep or hibernation state because they are nearly out of energy. In this case, it would be beneficial if the bus voltage were non-zero when the sun comes up, as the non-zero bus voltage may be used as an indication to the rest of the system that the sun is up and act as a trigger to wake the batteries up. In some embodiments, the maximizers are programmed to not enter the active state (or exit out of rapid shutdown mode) unless the DC bus voltage rises above a threshold (which would indicate that the system is not in rapid shutdown). That is, the maximizers are programmed to not simply go active when the sun comes up (allowing the maximizers to operate), but wait for the DC bus to go up (which would be done by another part of the system such as the ESS when not in rapid shutdown). However, if the system is hibernating due to lack of energy, and the only source of energy is the sun, then the bus should not be at zero, rather it should be at a non-zero value that can trigger the batteries to wake up. Allowing a maximizer to have a non-zero voltage when in rapid shutdown mode allows the overall bus voltage to be non-zero. The non-zero voltage on the bus in this case would indicate that there is sun out (and there is a source of energy), which would allow the bus to reach a voltage level that can be detected and used for other purposes, such as waking up a battery from an idle state, where the battery can then raise the DC bus voltage up further with its remaining charge, which is then detected by the individual optimizers, which are then in turn programmed to exit out of rapid shutdown mode.

As another example, as described above, in some embodiments, the maximizers are not necessarily programmed with specific individual output voltage limits (across the positive and negative output terminals of the maximizer), and the string limiting function running on each maximizer operates according to only the overall string voltage limit, such that the maximizers collectively limit to the string voltage limit. In this way, if the system detects that the DC bus is at a non-zero value (e.g., the collective string voltage limit), then this is an indication to the system (e.g., ESS, inverter, etc.) that the sun is available.

That is, in this example in which the system is disconnected from the grid, a DC bus voltage greater than 0V that can be detected from the ESS-side battery block (and is not caused by the battery block) is only possible if the PV converters are on, which in turn is dependent on there being sufficient sunlight for the solar panel to generate power.

As the only other source of power that could bring up the voltage of the DC bus to a non-zero level in this example is the PV array, then the DC-DC converter infers that the system is not in rapid shutdown (because otherwise there would not be any voltage on the DC bus), and that the sun is up (because only the PV array can be bringing up the voltage to this non-zero value). In response to detecting the voltage on the DC bus caused by operation of the PV converters in their low voltage mode when starting up (due to sunlight being available), the battery block then, in response, uses the reserve charge to bring up the voltage to a value that is above the low voltage mode limit (e.g., greater than 24V in this example). Using the mechanisms described above, the PV converters then autonomously determine, based on electrical measurements relative to their outputs, that they can transition from the low voltage mode to a high voltage mode (normal operation).

In some embodiments, to maintain the reserve amount of charge, the batteries are not permitted to fully discharge. For example, in some embodiments, the batteries are placed in a hibernation mode in which power is conserved judiciously, and a sufficient amount of energy is held in reserve to be able to at least charge up the DC bus.

As described above, when the PV converters (which are in rapid shutdown) determine that the DC bus voltage is greater than the low voltage mode limit for more than a threshold amount of time, then the PV converters determine that they can exit rapid shutdown mode (and no longer need to limit their output voltage for rapid shutdown purposes), and then enter a normal operation state.

The above techniques for allowing the system to run in a normal operating mode (e.g., by bringing up the DC bus voltage via a component other than the PV array) is usable in scenarios or cases when there is no connection to the AC grid, and there is little charge on the battery.

In the above example, the PV converters, when waking up, do not start up in their normal operating mode, but rather start up in rapid shutdown mode. This is done, for example, as a safety or precautionary measure. For example, if rapid shutdown had been initiated in the middle of the night (when the PV converters were not operational because of no power, and thus did not detect the open circuit condition), and were still in effect when the sun came up, if the PV converters woke up in the normal operating mode, this would cause them to momentarily rail the PV-side DC bus voltage to the normal, high voltage operating mode maximum voltage limit, such as 550V (before the rapid shutdown logic described herein would detect the open circuit condition and cause the PV converter to enter the rapid shutdown state).

As described above, in some embodiments, to prevent this, the PV converters are configured to start up in rapid shutdown mode. In some embodiments, the PV converters are determined with logic to allow them to independently and autonomously determine, when there is sun, whether they are allowed to exit rapid shutdown mode and operate normally.

In some embodiments, a PV converter is configured to exit rapid shutdown mode (and enter normal operating mode) when it determines that the voltage on the DC bus is above a threshold level due to another component in the home energy system (other than the PV converters).

For example, as described above, in some embodiments, the PV converter starts up in low voltage mode. That means, if the sun is up, the max voltage across the string will be limited to a maximum of 24V in this example. If at some point, while in the low voltage mode, the PV converter detects that the string output is above 24V for a threshold amount of time, then this increased voltage level will be due to some other component in the system, such as the inverter or the batteries. This would only occur if the PV disconnect switches are closed (otherwise, if open circuit with the PV disconnect switches open, then the voltage would be the rapid shutdown mode string limited 24V). Responsive to seeing the output voltage of the string exceeding the rapid shutdown mode maximum string voltage limit, the PV converters each independently exit out of rapid shutdown mode, and enter the normal operating mode.

As described above, in some embodiments, the PV converters enter rapid shutdown mode when their max voltage limit is reached and zero output current is detected (and for a threshold amount of time). In some embodiments, the PV converters are configured to exit rapid shutdown mode when a voltage limit of the maximizer (which will be a function of the voltage on the DC bus to which the PV array is connected) is determined to have been exceeded (and for a threshold amount of time).

As shown in the above example, a PV converter is configured to determine when to enter and exit a rapid shutdown mode based on a measurement of electrical characteristics taken relative to at least one of its outputs (e.g., of output current being below a threshold current, the voltage across its positive/negative terminals as compared to an optimizer voltage limit, and/or the voltage between one of the positive/negative terminals and the shared reference ground compared to at least a portion of a string voltage limit (e.g., half of the string voltage limit)).

Figure 5:
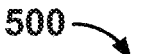
FIG. 5 is a flow diagram illustrating an embodiment of exiting rapid shutdown.
Figure 5:
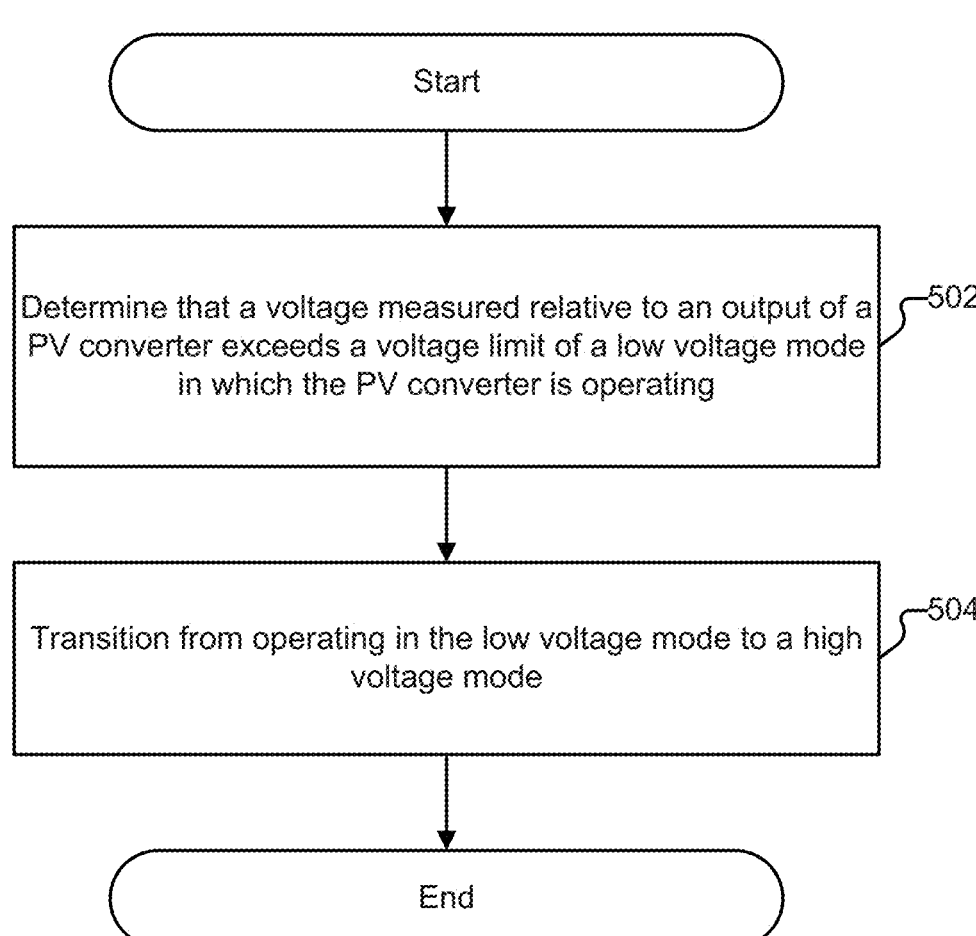

FIG. 5 is a flow diagram illustrating an embodiment of exiting rapid shutdown. In some embodiments, process 500 is executed by a PV converter, such as a PV optimizer or maximizer or converter coupled to a photovoltaic (PV) panel. The process begins at 502 when a voltage measured relative to an output of a PV converter is determined to exceed a voltage limit of a low voltage mode (e.g., rapid shutdown mode) that the PV converter is operating in. For example, the PV converter measures its individual output voltage and compares it against an individual voltage threshold (where the threshold is a threshold of the rapid shutdown (RSD) mode). (The PV converter may not be aware of the voltage across the entire DC bus, but can measure its share of the total bus voltage). When the output voltage meets or exceeds the threshold, this is an indication that another component of the energy system is providing power to the bus. This is in turn an indication that the system is not in rapid shutdown. For example, the output voltage will exceed the voltage limit of the rapid shutdown mode if the voltage on a DC bus across which a string of PV converters (including the PV converter that is in rapid shutdown mode) is connected is brought up by at least one of an inverter or a DC-DC converter coupled to an energy storage device.

For example, the PV converter, when in rapid shutdown mode, attempts to keep its output voltage at the rapid shutdown individual voltage maximum limit (e.g., 2.4V, which it will be able to do if it is the only source of power on the bus). But if the voltage at the output is higher than 2.4V, such as at 15V or 20V or any other threshold as appropriate, the controller of the PV converter is configured to determine that the system is no longer in rapid shutdown, and to exit the rapid shutdown mode. If another component external to the PV converter (e.g., inverter and/or batteries) is able to power up the bus in a manner that is detectable by the PV converter, then the PV converter is also able to determine that the PV disconnect switches have been closed again. As another example, the PV converter measures the voltage between one of its output terminals and a voltage reference (e.g., from the positive terminal to common ground, and/or from the negative terminal to common ground) and compares the voltage to at least a portion of a string voltage limit (e.g., half of the string voltage limit). If the measured voltage is greater than half of the string voltage limit, then the PV converter is also configured to exit or otherwise transition out of operating in a rapid shutdown mode.

At 504, in response to determining that the output voltage of the PV converter exceeds the voltage limit of the rapid shutdown mode, the rapid shutdown mode is exited. For example, the PV converter transitions from operating in the low voltage mode to a high voltage state (e.g., normal operation state). As one example, the parameters of the voltage limiting logic (e.g., optimizer output voltage limiting logic and string voltage limiting logic described above) according to which the PV converter operates are changed from low-voltage limits (for compliance with RSD) to high-voltage limits for normal operation.

Figure 6:
FIG. 6 is a flow diagram illustrating an embodiment of a process for increasing a voltage of a DC bus.
Figure 6:
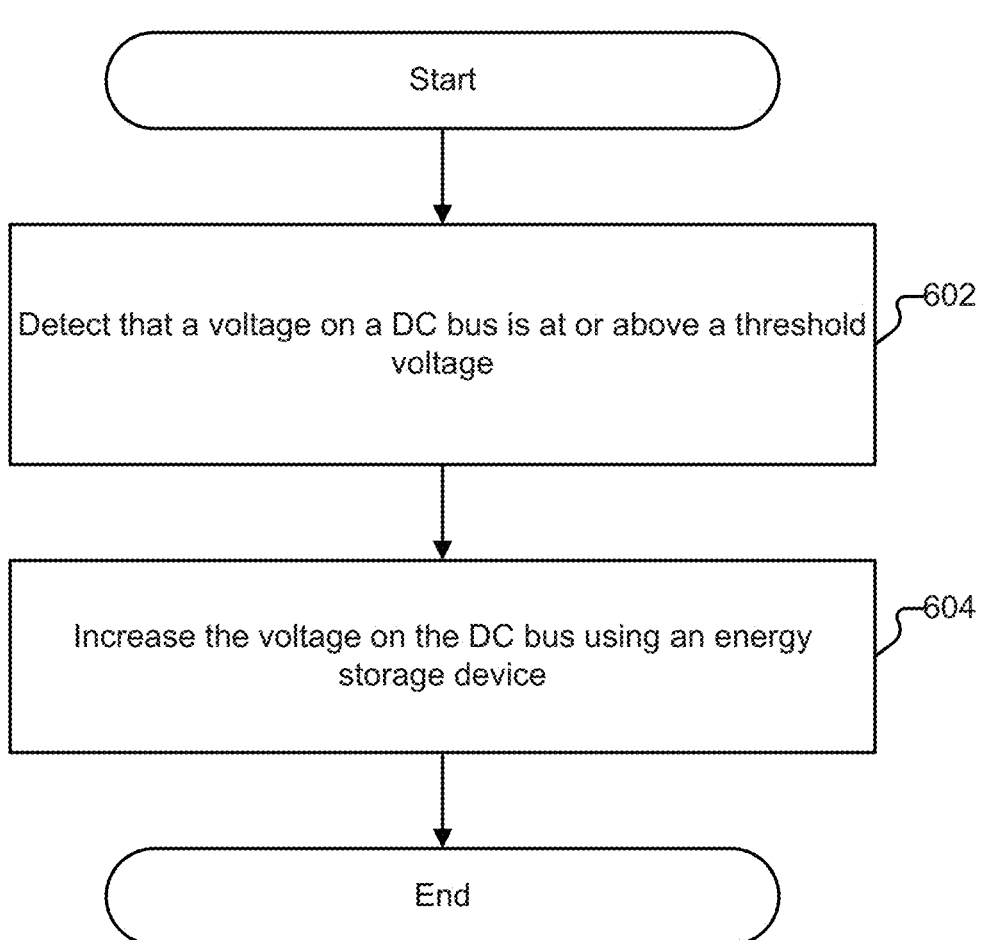

FIG. 6 is a flow diagram illustrating an embodiment of a process for increasing a voltage of a DC bus. In some embodiments, process 600 is executed by an energy storage device controller. The process begins at 602, when a voltage on a DC bus is detected to be at or above a threshold voltage. For example, a DC-DC converter connected to an energy storage device and connected to the DC bus includes a voltage sensor for detecting a voltage on the DC bus. In this example, the voltage on the DC bus is due to PV converters operating in a rapid shutdown mode, as described above.

At 604, based at least in part on detecting that the voltage on the DC bus is at or above the threshold voltage, the DC-DC converter is configured to increase the voltage on the DC bus. For example, the DC-DC converter is configured to charge up capacitors connected to the DC bus to bring up the voltage on the DC bus.

In some embodiments, if the system is grid connected, then an inverter may be used to bring the DC bus up, rather than using energy storage.

In some embodiments, PV converters are configured to, using process 500, detect the increased voltage on the DC bus (where a portion of the DC bus voltage will appear on the output of the PV converter that exceeds its individual limit), and in response, exit rapid shutdown mode (e.g., no longer limit their voltage to be at or below the low-voltage limits set by rapid shutdown).

Inhibiting Inadvertent Transitioning to Rapid Shutdown Mode

As described above, optimizers enter rapid shutdown mode by detecting a type of open circuit condition (or loss of loads or sinks for current) that is caused by an RSD initiation device being activated.

There may be some scenarios under normal operating conditions which may meet the criteria for causing a PV converter to enter RSD mode, even though RSD has not actually been initiated. For example, as described above, each PV optimizer is configured to detect an open circuit detection (that would be induced by rapid shutdown) by making various electrical measurements relative to one or more of its outputs, as described above. In some embodiments, as described above, the type of electrical measurements made by the PV converter that trigger a determination of an open circuit condition are that the PV converter is at a voltage limit (specified according to the high voltage normal mode of operation), and that no current has been outputted for more than a threshold amount of time.

There may be times, during the normal course of operation (and when the system is not in rapid shutdown), that a PV converter is at a voltage limit, and that no current has been outputted for more than a threshold amount of time. One example is suppose a period of time when the sun is shining, but there are no loads demanding electrical power (e.g., the battery is fully charged, there are no loads, and the site is operating off-grid, so excess solar power cannot be delivered to the grid). In this case, because the sun is shining, and there is no current from the ESS-side, the voltage across the string of PV converters will continue to rise until a voltage limit (optimizer output individual voltage limit, or limit based on string voltage limit parameter) is reached. Further, even though the PV disconnect switches are closed (and the PV array is connected to the home energy system), the output current of the optimizers is zero because there is no place for any power to be delivered. In this case, the criteria of zero current for more than a threshold amount of time will be met. For example, the limiting feature, to prevent the output voltage from exceeding a limit, will also reduce its output current. In this way, there is net zero current.

In this case, even though the PV disconnect switches are not open (and are still closed), the criteria for an open circuit, or no load condition will be detected by a PV converter. In this case, a false positive case of detecting rapid shutdown conditions may cause the PV converter to autonomously decide to go into rapid shutdown, even if rapid shutdown has not actually been initiated.

The following are embodiments of inhibiting or blocking a PV converter from entering rapid shutdown, to, for example, prevent false positives causing a PV converter to enter into rapid shutdown mode (e.g., open circuit criteria met, but the system is not actually in rapid shutdown).

As described above, in some embodiments, a maximizer is programmed with logic to wake up (or exit rapid shutdown mode) when it detects that the DC bus voltage is up (which would be brought up by the rest of the system if it is not in rapid shutdown). In some embodiments, to address a situation in which there is an open circuit condition due to no load, but the system is still operational (and rapid shutdown was not triggered), which will cause the maximizers to enter into rapid shutdown mode, the maximizers are programmed with a time delay before executing wake up logic for detecting whether the bus is up. As another example, each maximizer is programmed with a timeout period or timer in which the maximizer is not permitted to exit out of rapid shutdown. For example, after the maximizer enters rapid shutdown mode, the maximizer is programmed to wait a threshold amount of time before checking on whether conditions for wake up (such as those described above) have been met, indicating that that the DC bus voltage is up. If, after the timeout period, it is detected that the DC bus is up, then the maximizer will exit the rapid shutdown state and enter into the active operational state.

That is, there may be conditions other than rapid shutdown that would trigger the rapid shutdown logic running on the maximizer. One example is if the system cannot absorb any PV power (which would result in no current, and the maximizer detecting an open circuit condition). However, if initiation of rapid shutdown is not the cause of the system appearing to be an open circuit from the perspective of the maximizer, then the DC bus voltage will remain up (because the ESS was not turned off, since rapid shutdown had not been initiated), and after the maximizer enters into rapid shutdown, the maximizer will subsequently detect that the DC bus voltage is still up. Based on the wake-up logic described above, the maximizer will then wake up again (and exit out of rapid shutdown mode) based on the wake-up logic detecting that the DC bus voltage is up. In some embodiments, to allow sufficient time for the DC bus to come down and ensure that all of the maximizers enter into the rapid shutdown state collectively in the event that rapid shutdown was actually initiated, a time delay or timeout period is implemented, where the wake up logic does not execute (or the maximizer is not allowed to exit rapid shutdown) until a threshold amount of time after rapid shutdown has been entered. As one example, the time delay is selected to be greater than the timing requirement for rapid shutdown. For example, if the rapid shutdown requirement is 30 seconds, then the time delay is selected to be greater, such as 1 minute. As shown in the examples above, in some embodiments, the wake-up logic operates in combination with a timer (which starts from when the maximizer enters rapid shutdown state), where the maximizer is not allowed to exit the rapid shutdown state until after the timer expires (even if conditions for detecting that the DC bus voltage is up are met before expiration of the timer).

In the case where the open circuit condition is due to a lack of load (and not because of rapid shutdown initiation), the maximizer will go into the rapid shutdown state because the criteria for an open circuit condition have been detected, and will then wait a certain amount of time before checking for the wake up conditions to be met. Since rapid shutdown had not been initiated in this case, after the timeout period, the maximizer will subsequently detect that the DC bus voltage is up, and the maximizer will go back to the active state. In this scenario, where the system is unable to absorb any PV power, the maximizer may cycle in and out of the rapid shutdown state until the condition of the system being unable to absorb PV power disappears. For example, at some point a homeowner may turn on the lights in the house, which will draw some amount of power out of the batteries. The batteries will then no longer be full, in which case they are able to absorb power from the PV optimizer. There will then be non-zero current being drawn and pushed into the system, and the PV maximizers will not enter rapid shutdown.

As another example, when in rapid shutdown mode, the PV converters bring their individual output voltage (across their output terminals) down from the maximum normal operating voltage to a maximum allowed rapid shutdown voltage (e.g., of 2.4V). Suppose that the PV converter is currently operating in its high voltage mode, and there are no loads requiring power at the moment. Zero current would flow as there is no demand for electricity. This would appear to the PV converter as an open circuit condition, and the PV converter would enter into the low voltage RSD mode and attempt to lower its voltage output to 2.4V. However, because rapid shutdown has not actually occurred, the PV converter is still electrically connected to the DC bus (because the PV disconnect switches are closed, and the inverter and/or batteries are operating normally), which will be maintained to a certain DC link voltage by the DC-DC converters. In this case, the PV converter will not be able to bring down the voltage to 2.4V within 30 seconds. In some embodiments, the PV converter is programmed such that if it is in rapid shutdown mode, but its output voltage does not come down to the required 2.4V (or below a voltage limit threshold) by a threshold amount of time, then the PV converter exits rapid shutdown (because the system is not actually in rapid shutdown, and the PV converter had only initiated rapid shutdown protocols because there were not any loads at the time and the rapid shutdown open circuit criteria happened to have been met). For example, per the rapid shutdown requirements, the individual PV converter output voltages should fall below the 2.4V limit quickly (e.g., within the 30 seconds mandated by the requirement). In some embodiments, if the voltage on the output of the PV converter, while in rapid shutdown mode, does not drop to below the low-voltage rapid shutdown allowed voltage (of 2.4V in this example, which is detected using the voltage sensor at the output of the PV converter) after a threshold amount of time (e.g., one minute, or some threshold amount of time greater than the 30 second time requirement of rapid shutdown), then the PV converter exits rapid shutdown and returns to its normal (active) operating mode. That is, if the PV converter is unable to meet the voltage level parameters specified for its rapid shutdown mode after a threshold amount of time (which would be because some other component, such as the batteries, is keeping the DC bus voltage up), then the PV converter infers that the system is not actually in rapid shutdown (and that the system had coincidentally been operating in a manner that appears similar to the open circuit scenario that the PV converter monitors for, and that would occur if rapid shutdown were initiated), and exits out of rapid shutdown.

In this example, if it is confirmed that the DC bus voltage is still up for a long period after the PV converter went into rapid shutdown, then this is an indication to the PV converter that the system is not actually in a rapid shutdown state. In effect, if a PV optimizer determines that it is unable to reach the required voltage levels for rapid shutdown (e.g., fails to induce rapid shutdown in accordance with the requirements), then it cancels rapid shutdown mode and returns to a normal operation mode.

In long periods in which there are no loads to deliver solar power to (e.g., because the batteries are full, all loads in the house are off, and the house is not connected to the grid), the PV converter may cycle or alternate between entering and exerting the rapid shutdown mode. This is not necessarily detrimental to the system, and the DC bus voltage would simply fluctuate between some nominal or equilibrium value (e.g., 400V) and the maximum string voltage allowed (e.g., 550V). For example, if the system is not drawing as much as the solar panels are able to produce, then the voltage of the DC bus will rail to the maximum limit of 550V (where the PV converters reduce their output current, and where the aggregate behavior of the PV converters in the string causes the string voltage to be limited to 550V). If there are loads that need electricity, and more power is drawn than the solar panels can provide, then the PV array voltage will decrease. The DC bus voltage of the system will then settle down to an equilibrium voltage in which the loads take whatever power is being produced.

Minimum System Load

In some embodiments, to avoid ping-ponging or cycling of the PV converters into and out of rapid shutdown mode when there are no loads (and thus no current, which could trigger the PV converters going into rapid shutdown mode, even if rapid shutdown had not actually been initiated), the inverter is configured to maintain a minimum load. For example, if the inverter senses no load on the system, a minimum load, such as a battery heater, fan, etc. is activated.

Figure 7:
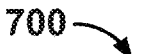
FIG. 7 is a flow diagram illustrating an embodiment of a process for managing transitioning into a low voltage mode.
Figure 7:
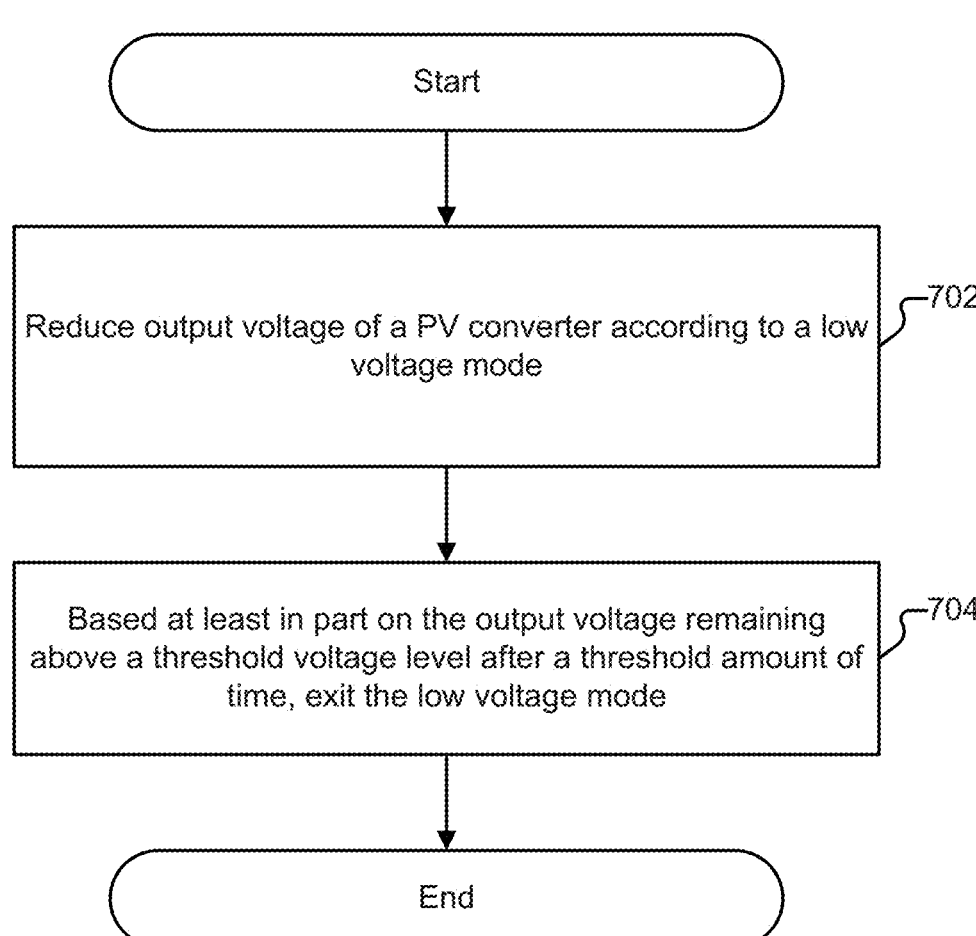

FIG. 7 is a flow diagram illustrating an embodiment of a process for managing transitioning into a low voltage mode. Process 700 may be used to prevent a PV converter from inadvertently or incorrectly entering a rapid shutdown mode. In some embodiments, process 700 is executed by a PV converter, such as a PV optimizer or maximizer. The process begins at 702, when a PV converter reduces its output voltage according to a low voltage mode, such as a rapid shutdown mode. For example, the output voltage is reduced based at least in part on the entering of a rapid shutdown mode. As one example, the PV converter enters rapid shutdown mode based on process 400 of FIG. 4.

At 704, based at least in part on determining that the output voltage has not reduced to a threshold level within a threshold amount of time, the rapid shutdown mode is exited. For example, if the PV converter is in rapid shutdown mode, it will attempt to bring its output voltage down to a low optimizer output voltage limit (e.g., 2.4V). However, if another component is keeping the DC bus voltage up (e.g., inverter and/or battery), then this is an indication that the system is not actually in rapid shutdown, and the PV converter exits rapid shutdown operation. This is similar to the process described in conjunction with process 500 of FIG. 5, except that the rapid shutdown mode may be exited even before the output voltage is brought down to the low-voltage limit of 2.4V specified for rapid shutdown. Here, if the PV converter determines that it is unable to lower its output voltage within the threshold amount of time (or the output voltage remains above a threshold voltage after the threshold amount of time), then the PV converter exits rapid shutdown mode, and returns to a normal active operating mode. Similarly, if the PV converter is unable to cause the voltage measured between the common reference and one of its positive or negative output terminals to fall below a threshold voltage based on the rapid shutdown string voltage limit (e.g., half of the RSD string voltage limit), within a threshold amount of time, then the PV converter determines that the system is not in rapid shutdown, and transitions back to the normal operating mode.

Figure 8:
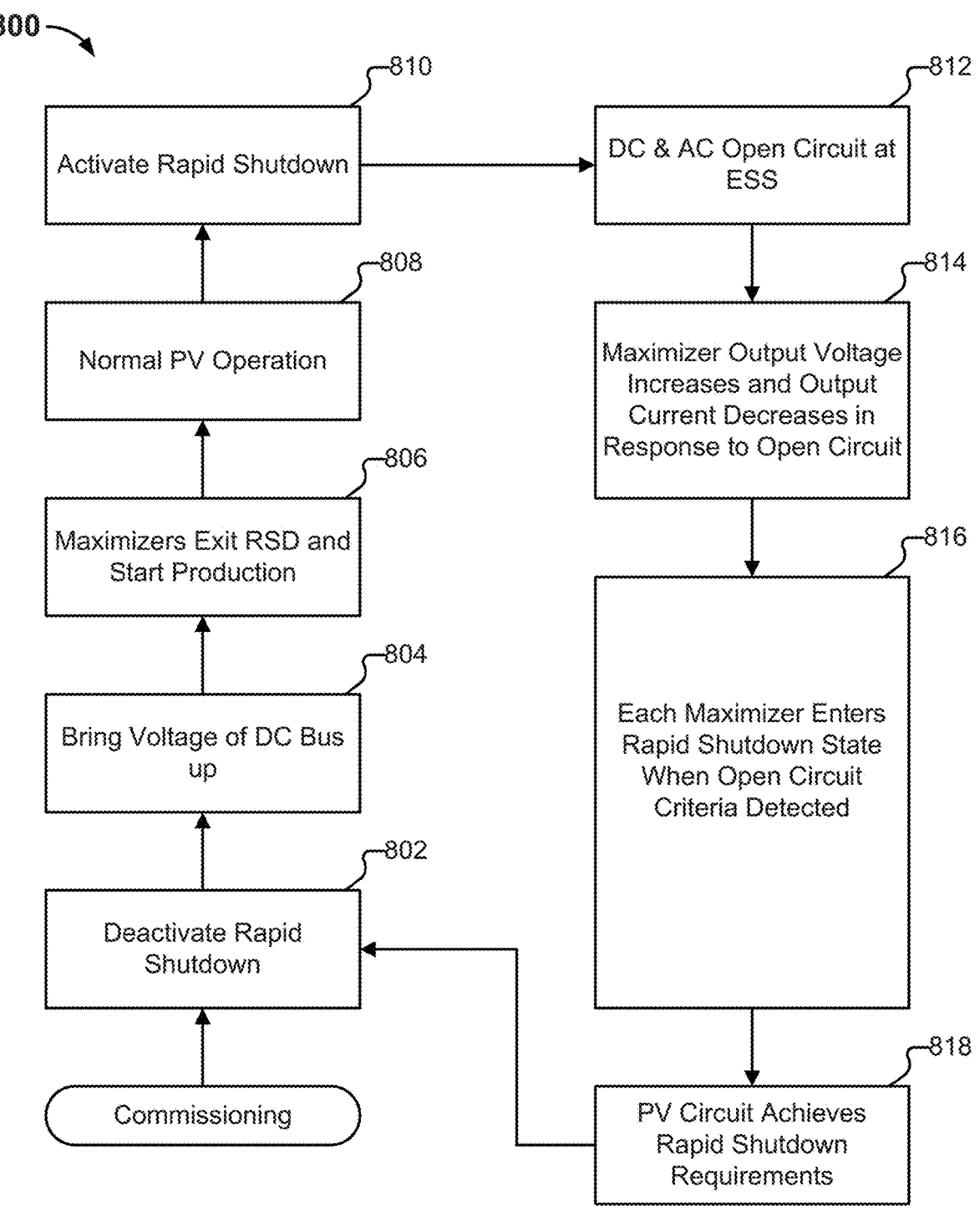
FIG. 8 is a flow diagram illustrating an embodiment of an operation of a solar power system.

FIG. 8 is a flow diagram illustrating an embodiment of the operation of a solar power system. In some embodiments, process 800 is executed by the home energy system shown in the example of FIG. 1.

In this example, at 802, an action is taken to step down from rapid shutdown mode and, for example, resume normal operation of the home energy system. For example, an E-stop is cancelled, and PV disconnect switches are closed. This may occur when the system had been in rapid shutdown, but rapid shutdown had been cancelled, or when commissioning the system.

At 804, a DC bus of the system (that connects a PV array with an ESS that includes an inverter and energy storage) is brought up. For example, using process 600 of FIG. 6, the batteries (or grid) are used to bring up the voltage of the DC bus to a level that is above what the voltage would be due to the PV converters being in rapid shutdown. For example, the batteries bring up the DC bus voltage from <20V up to >25V.

At 806, in response to detecting that the DC bus is at a voltage that is higher than it would output when in rapid shutdown mode, the maximizers exit rapid shutdown mode and begin production of solar power. For example, the maximizers start production when the DC bus is above a threshold voltage (e.g., >25V) for more than a threshold amount of time (e.g., >5 seconds). In some embodiments, the timing threshold is to ensure that the maximizers do not inadvertently exit RSD mode due to a random spike or noise on the DC bus.

At 808, the home energy system operates in a normal PV operation state.

At 810, an action is taken in which RSD initiation occurs. For example, the E-stop 132 is activated by a user or the PV disconnect switches are opened, commanding rapid shutdown.

At 812, at the ESS-side, there is a DC and AC open circuit. For example, there is opening of the AC relays to the grid, as well as shutting down of the inverter and batteries. The PV disconnect switches may also be open. Further details regarding shutting down of the ESS are described above.

At 814, due to the open circuit condition, the output voltage of a maximizer increases, and the output current decreases in response to the open circuit (e.g., per voltage limiting, as described above).

At 816, each maximizer enters rapid shutdown state when the maximizer detects any of the following (e.g., using process 400 of FIG. 4):

Voltage>string voltage limit (e.g., 550 VDC) between PV(−) (negative side of PV-side DC bus) and their individual positive output terminal (this will occur for the maximizer at the "top" of the string (e.g., optimizer 124), depending on string length); OR Voltage>half of the string voltage limit (e.g., 275 VDC) between the GND 130 and their individual positive output terminal (this will occur for the maximizer at the "top" of the string (e.g., optimizer 124), depending on string length); OR Voltage between PV(−) (negative side of the PV-side DC bus) and GND 130 drops below a threshold voltage (e.g., 20V) (this will occur as a maximizer's pull down resistor pulls the maximizer's output voltage (across its output terminals) to be below 1V).

At 818, with the maximizers in rapid shutdown, the PV circuit meets the requirements of rapid shutdown (e.g., <30V on the PV-side DC bus in <30 seconds). When RSD is cancelled (e.g., by a user causing the PV disconnect switches to be closed again, connecting the ESS and PV-sides together), the process returns to 802, when the system is restarted and is transitioned from being in rapid shutdown to a normal operation mode.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A rapid shutdown system comprising:
   a PV (photovoltaic) generator;
   a DC (Direct Current)-DC converter receiving power from the PV generator and outputting power, wherein the DC-DC converter is one of a plurality of DC-DC converters connected in series; and
   a DC bus coupled to the DC-DC converter to receive the power outputted by the DC-DC converter;
   wherein the DC bus is coupled to a system comprising a load; and
   wherein each DC-DC converter in the plurality of series-connected DC-DC converters:
      outputs power at a high voltage state or a low voltage state; and
      is configured to autonomously transition from operating in the high voltage state to the low voltage state responsive to local detection of:
         an output current of a given DC-DC converter transitioning below a threshold current; and
         a local output voltage of the given DC-DC converter, measured relative to terminals of the given DC-DC converter, reaching a voltage limit.

2. The rapid shutdown system of claim 1, wherein the DC bus is coupled to the system by a switch, and wherein opening of the switch causes the output current of the given DC-DC converter to transition below the threshold current.

3. The rapid shutdown system of claim 1, wherein autonomously transitioning from the high voltage state to the low voltage state comprises deactivating the given DC-DC converter.

4. The rapid shutdown system of claim 1, wherein given DC-DC converter is configured to autonomously transition from the high voltage state to the low voltage state based at least in part on the output current of the given DC-DC converter being below the threshold current for at least a threshold amount of time.

5. The rapid shutdown system of claim 1, wherein the given DC-DC converter is configured to autonomously transition from the high voltage state to the low voltage state based at least in part on a voltage limit of the high voltage state having been met.

6. The rapid shutdown system of claim 1, wherein the DC-DC converter comprises an optimizer or a maximizer.

7. The rapid shutdown system of claim 1, wherein given DC-DC converter is configured to autonomously transition from the low voltage state to the high voltage state based at least in part on the local output voltage, measured relative to the terminals of the given DC-DC converter, exceeding a voltage limit of the low voltage state.

8. The rapid shutdown system of claim 7, wherein the given DC-DC converter comprises a positive output terminal and a negative output terminal, and wherein the local output voltage of the given DC-DC converter is measured between the positive output terminal and the negative output terminal.

9. The rapid shutdown system of claim 7, wherein the given DC-DC converter comprises a positive output terminal, a negative output terminal, and a connection to a node common to the plurality of DC-DC converters, and wherein the local output voltage of the given DC-DC converter is measured between the common node and one of the positive and negative output terminals.

10. The rapid shutdown system of claim 1, wherein the given DC-DC converter is configured to autonomously transition from the low voltage state to the high voltage state based at least in part on the local output voltage, measured relative to the terminals of the given DC-DC converter, remaining above a threshold voltage level of the low voltage state after a threshold amount of time.

11. A method, comprising:
   receiving power from a PV (photovoltaic) generator and outputting power by a DC (Direct Current)-DC converter, wherein the DC-DC converter is one of a plurality of DC-DC converters connected in series;
   wherein a DC bus is coupled to the DC-DC converter to receive the power outputted by the DC-DC converter, and wherein the DC bus is coupled to a system comprising a load; and
   wherein each DC-DC converter in the plurality of series-connected DC-DC converters:
      outputs power at a high voltage state or a low voltage state; and
      is configured to autonomously transition from operating in the high voltage state to the low voltage state responsive to local detection of:
         an output current of a given DC-DC converter transitioning below a threshold current; and
         a local output voltage of the given DC-DC converter, measured relative to terminals of the given DC-DC converter, reaching a voltage limit.

12. The method of claim 11, wherein the DC bus is coupled to the system by a switch, and wherein opening of the switch causes the output current of the given DC-DC converter to transition below the threshold current.

13. The method of claim 11, wherein autonomously transitioning from the high voltage state to the low voltage state comprises deactivating the given DC-DC converter.

14. The method of claim 11, wherein the given DC-DC converter is configured to autonomously transition from the high voltage state to the low voltage state based at least in part on the output current of the given DC-DC converter being below the threshold current for at least a threshold amount of time.

15. The method of claim 11, wherein the given DC-DC converter is configured to autonomously transition from the high voltage state to the low voltage state based at least in part on a voltage limit of the high voltage state having been met.

16. The method of claim 11, wherein the DC-DC converter comprises an optimizer or a maximizer.

17. The method of claim 11, wherein the given DC-DC converter is configured to autonomously transition from the low voltage state to the high voltage state based at least in part on the local output voltage, measured relative to the terminals of the given DC-DC converter, exceeding a voltage limit of the low voltage state.

18. The method of claim 17, wherein the given DC-DC converter comprises a positive output terminal and a negative output terminal, and wherein the local output voltage of the given DC-DC converter is measured between the positive output terminal and the negative output terminal.

19. The method of claim 17, wherein the given DC-DC converter comprises a positive output terminal, a negative output terminal, and a connection to a node common to the plurality of DC-DC converters, and wherein the local output voltage of the given DC-DC converter is measured between the common node and one of the positive and negative output terminals.

20. The method of claim 11, wherein the given DC-DC converter is configured to autonomously transition from the low voltage state to the high voltage state based at least in part on local output voltage, measured relative to the terminals of the given DC-DC converter, remaining above a threshold voltage level of the low voltage state after a threshold amount of time.

\* \* \* \* \*